US007065326B2

(12) United States Patent
Lovberg et al.

(10) Patent No.: US 7,065,326 B2
(45) Date of Patent: Jun. 20, 2006

(54) MILLIMETER WAVE COMMUNICATIONS SYSTEM WITH A HIGH PERFORMANCE MODULATOR CIRCUIT

(75) Inventors: John Lovberg, San Diego, CA (US); Richard Chedester, Whately, MA (US); Paul Johnson, Kihei, HI (US); Louis Slaughter, Weston, MA (US)

(73) Assignee: Trex Enterprises Corporation, San Diego, CA (US)

( * ) Notice: Subject to any disclaimer, the term of this patent is extended or adjusted under 35 U.S.C. 154(b) by 0 days.

(21) Appl. No.: 10/319,058

(22) Filed: Dec. 12, 2002

(65) Prior Publication Data

US 2003/0224801 A1 Dec. 4, 2003

Related U.S. Application Data

(63) Continuation-in-part of application No. 10/196,486, filed on Jul. 15, 2002, and a continuation-in-part of application No. 10/127,886, filed on Apr. 23, 2002, now abandoned, and a continuation-in-part of application No. 10/061,872, filed on Jan. 31, 2002, now abandoned, and a continuation-in-part of application No. 10/044,556, filed on Jan. 11, 2002, now Pat. No. 6,587,699, and a continuation-in-part of application No. 10/041,083, filed on Jan. 5, 2002, now Pat. No. 6,611,696, and a continuation-in-part of application No. 10/025,127, filed on Dec. 18, 2001, now abandoned, and a continuation-in-part of application No. 10/000,182, filed on Dec. 1, 2001, now abandoned, and a continuation-in-part of application No. 09/992,251, filed on Nov. 13, 2001, now abandoned, and a continuation-in-part of application No. 10/001,617, filed on Oct. 30, 2001, now abandoned, and a continuation-in-part of application No. 10/046,348, filed on Oct. 25, 2001, now abandoned, and a continuation-in-part of application No. 09/847,629, filed on May 2, 2001, now Pat. No. 6,556,836.

(51) Int. Cl.
*H04B 1/40* (2006.01)
*H03C 3/00* (2006.01)

(52) U.S. Cl. ............... 455/77; 455/562.1; 332/141
(58) Field of Classification Search ............... None
See application file for complete search history.

(56) References Cited

U.S. PATENT DOCUMENTS 6,016,313 A * 1/2000 Foster, Jr. et al. ....... 455/562.1

(Continued)

*Primary Examiner*—Rafael Perez-Gutierrez
(74) *Attorney, Agent, or Firm*—John R. Ross; John R. Ross, III

(57) ABSTRACT

A high data rate communication system operating at frequencies greater than 70 MHz and at data rates of about 1.25 Gbps or greater. Preferred embodiments include modulators with a resonant LC circuit including a diode which is back-biased for "off" (i.e., no transmit) and forward biased for "on" (or transmit). The modulator is a part of high performance transceivers for wireless, millimeter wave communications links. A preferred embodiment provides a communication link of more than eight miles which operates within the 71 to 76 GHz portion of the millimeter spectrum and provides data transmission rates of 1.25 Gbps with bit error rates of less than $10^{-10}$. A first transceiver transmits at a first bandwidth and receives at a second bandwidth both within the above spectral range. A second transceiver transmits at the second bandwidth and receives at the first bandwidth. The transceivers are equipped with antennas providing beam divergence small enough to ensure efficient spatial and directional partitioning of the data channels so that an almost unlimited number of transceivers will be able to simultaneously use the same spectrum. In a preferred embodiment the first and second spectral ranges are 71.8+/−0.63 GHz and 73.8+/−0.63 GHz and the half power beam width is about 0.2 degrees or less. Preferably, a backup transceiver set is provided which would take over the link in the event of very bad weather conditions. In other embodiments especially useful for mobile applications at least one of the transceivers include a GPS locator.

25 Claims, 33 Drawing Sheets

U.S. PATENT DOCUMENTS

| | | | |
|---|---|---|---|
| 6,163,231 A * | 12/2000 | Phaneuf | 455/108 |
| 6,556,836 B1 * | 4/2003 | Lovberg et al. | 455/505 |
| 6,587,699 B1 * | 7/2003 | Olsen et al. | 455/25 |
| 6,611,696 B1 * | 8/2003 | Chedester et al. | 455/25 |
| 6,665,546 B1 * | 12/2003 | Slaughter et al. | 455/562.1 |
| 6,714,800 B1 * | 3/2004 | Johnson et al. | 455/562.1 |
| 2002/0164945 A1 * | 11/2002 | Olsen et al. | 455/3.01 |
| 2002/0164946 A1 * | 11/2002 | Olsen et al. | 455/562.1 |
| 2002/0164951 A1 * | 11/2002 | Slaughter et al. | 455/25 |
| 2002/0164957 A1 * | 11/2002 | Lovberg et al. | 455/424 |
| 2002/0164958 A1 * | 11/2002 | Slaughter et al. | 455/8 |
| 2002/0164959 A1 * | 11/2002 | Olsen et al. | 455/505 |
| 2002/0164960 A1 * | 11/2002 | Slaughter et al. | 455/500 |
| 2002/0165001 A1 * | 11/2002 | Phillips et al. | 455/500 |
| 2002/0165002 A1 * | 11/2002 | Kolinko et al. | 455/500 |
| 2002/0177405 A1 * | 11/2002 | Chedester et al. | 455/73 |
| 2002/0187754 A1 * | 12/2002 | Chedester et al. | 455/73 |
| 2002/0187769 A1 * | 12/2002 | Johnson et al. | 455/562.1 |
| 2003/0022694 A1 * | 1/2003 | Olsen et al. | 455/562.1 |
| 2003/0027586 A1 * | 2/2003 | Johnson et al. | 455/517 |
| 2003/0060171 A1 * | 3/2003 | Lovberg et al. | 455/73 |

* cited by examiner

FULL DUPLEX MILLIMETER-WAVE LINK

SPECTRUM PLAN OF 1.25 Gbps mm-WAVE COMMUNICATION SYSTEM
(73.8 ± 0.63 GHz TRANSMITTER, 71.8 ±0.63 GHz RECEIVER)

WAVEFORMS OF DETECTED SIGNAL AT 1.25 Gbps.
PRBS7 PATTERN, SIGNAL ATTENUATION 60 dB

RAW DETECTED SIGNAL

SAME SIGNAL AFTER CLOCK/DATA RECOVERY

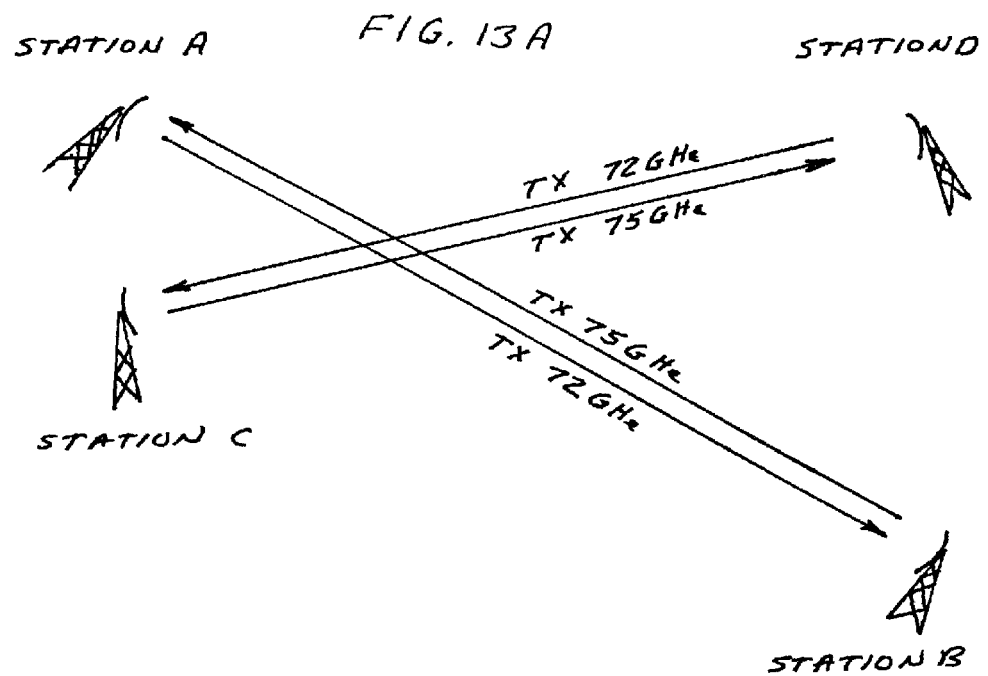

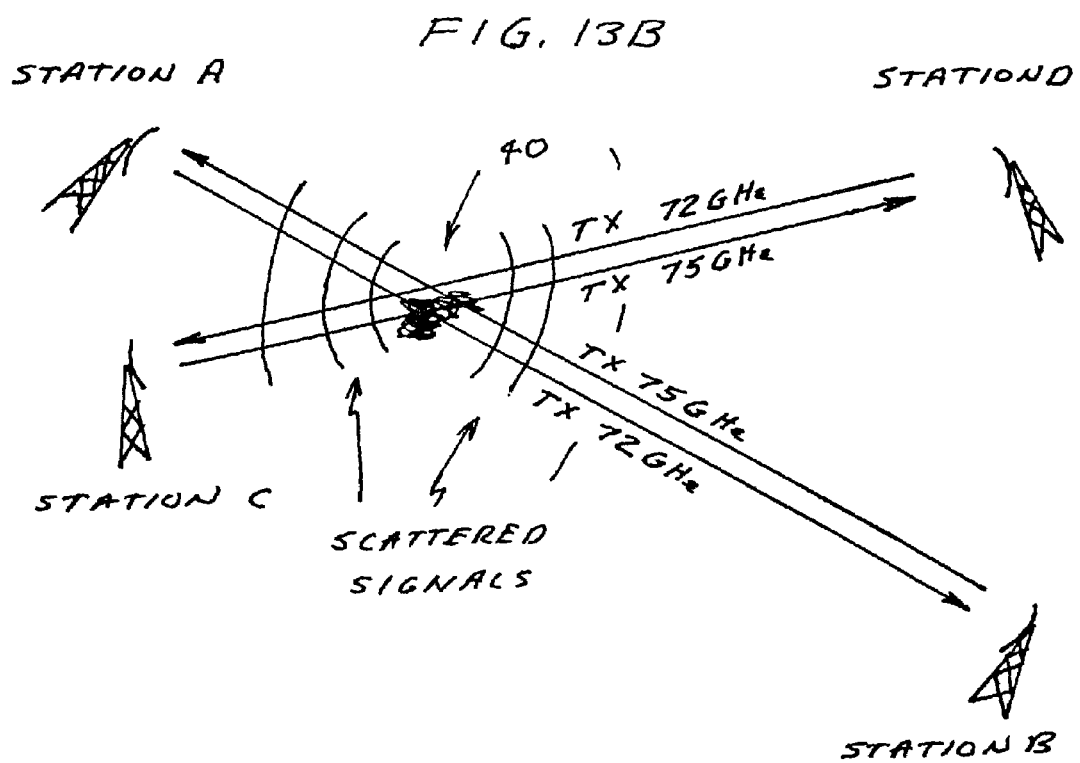

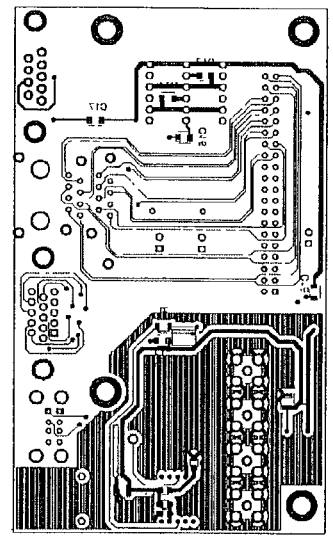
FIG.18B BOTTOM
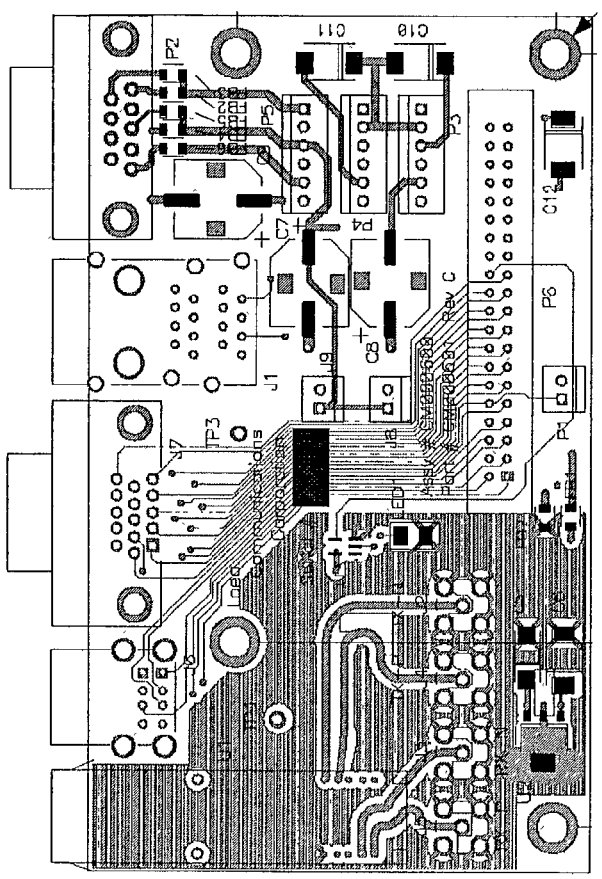
FIG.18A TOP

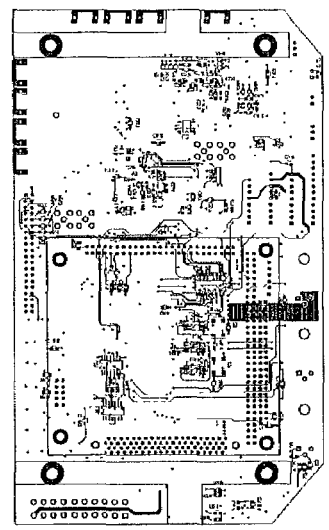
FIG. 19B BOTTOM
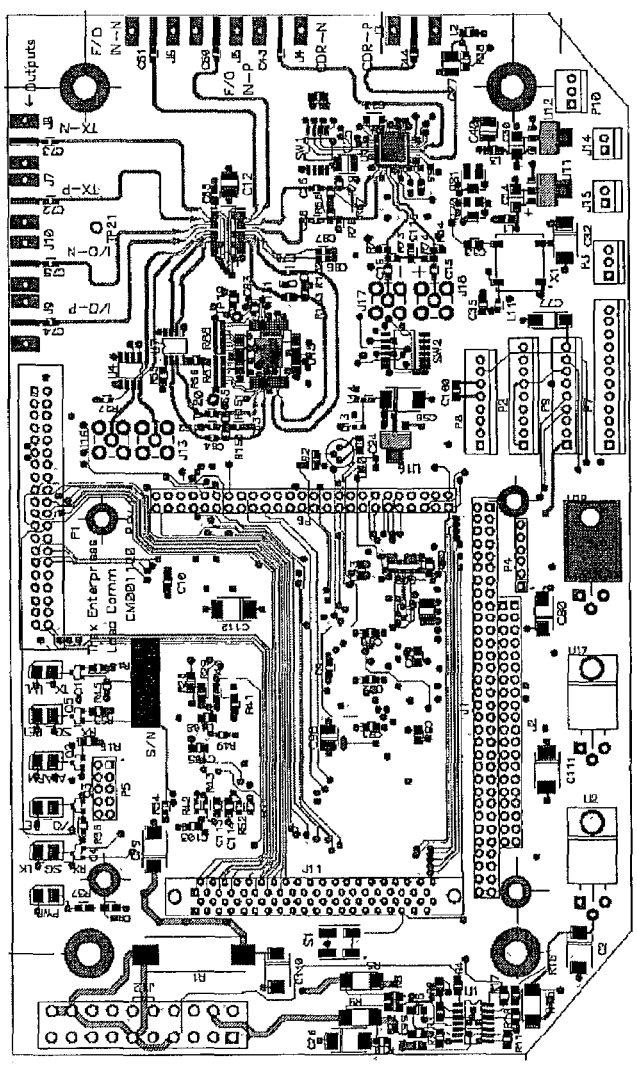
FIG. 19A TOP

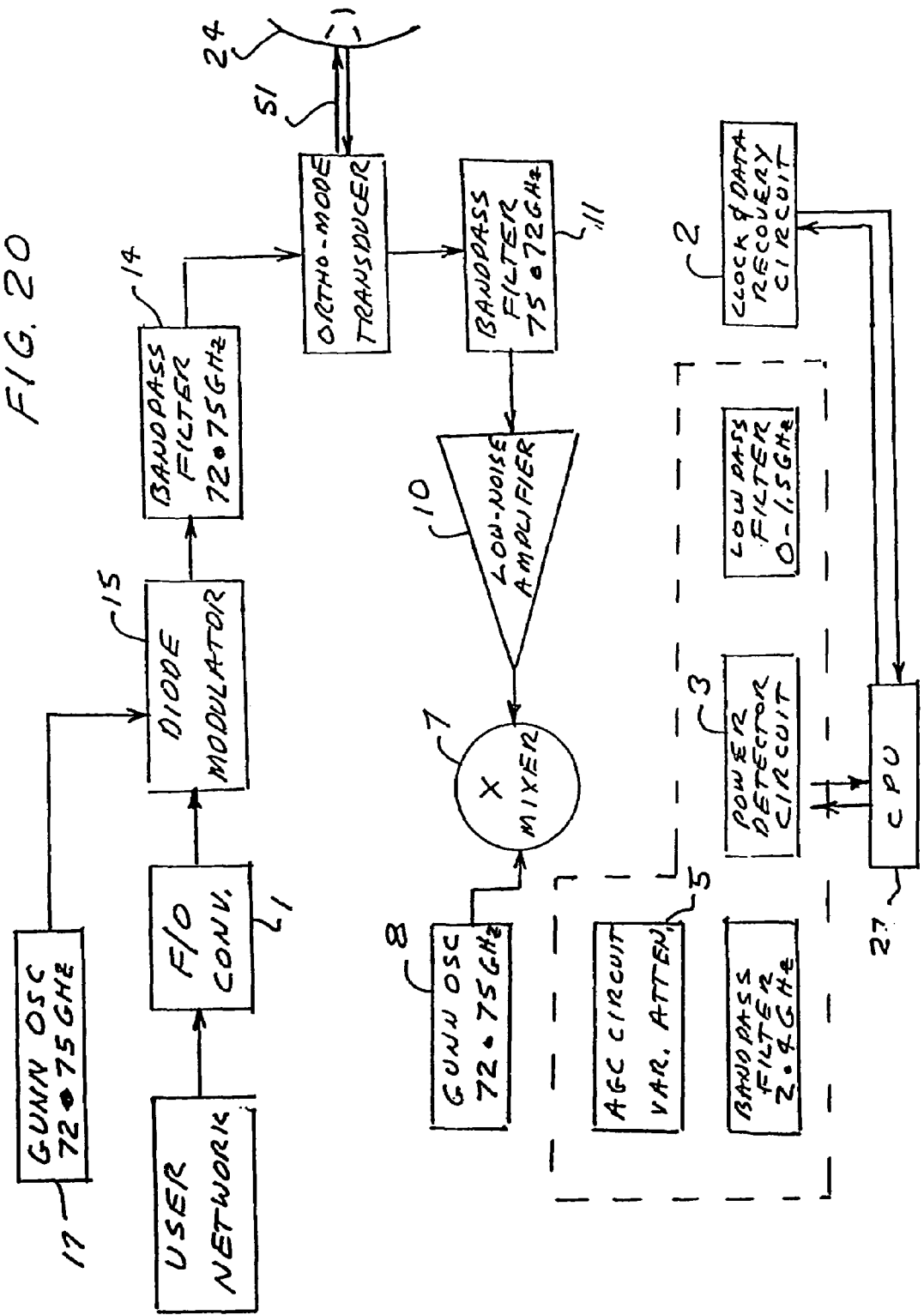

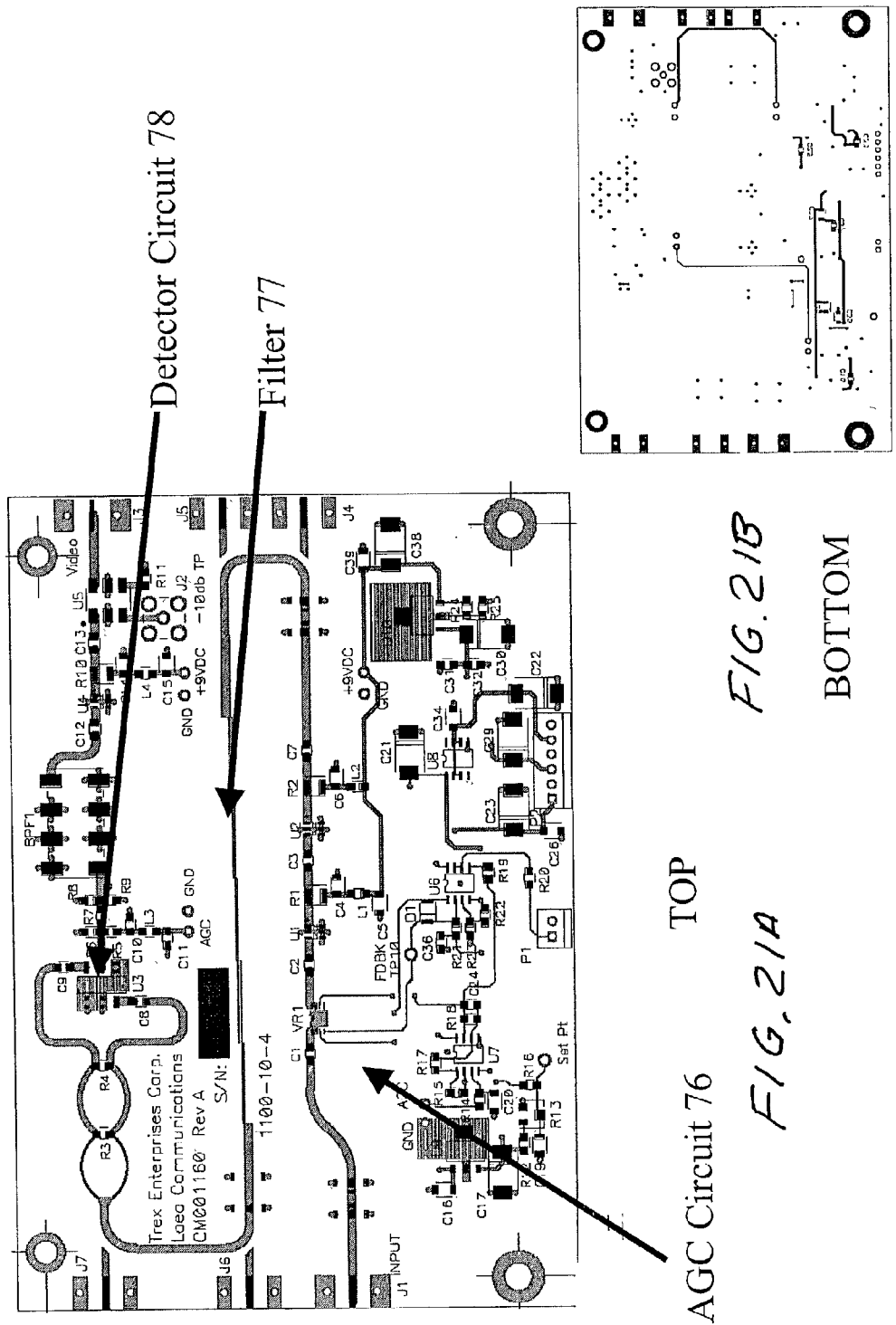

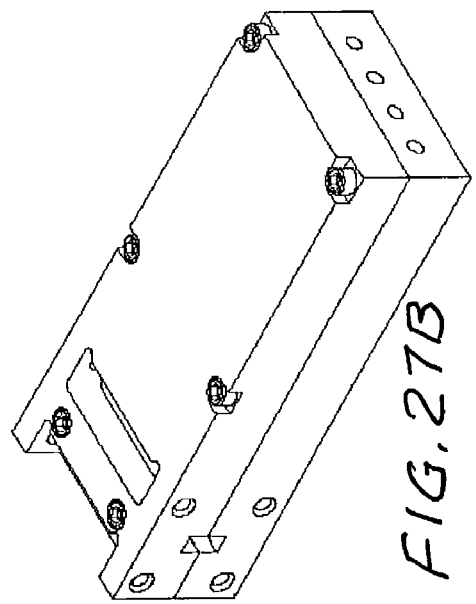
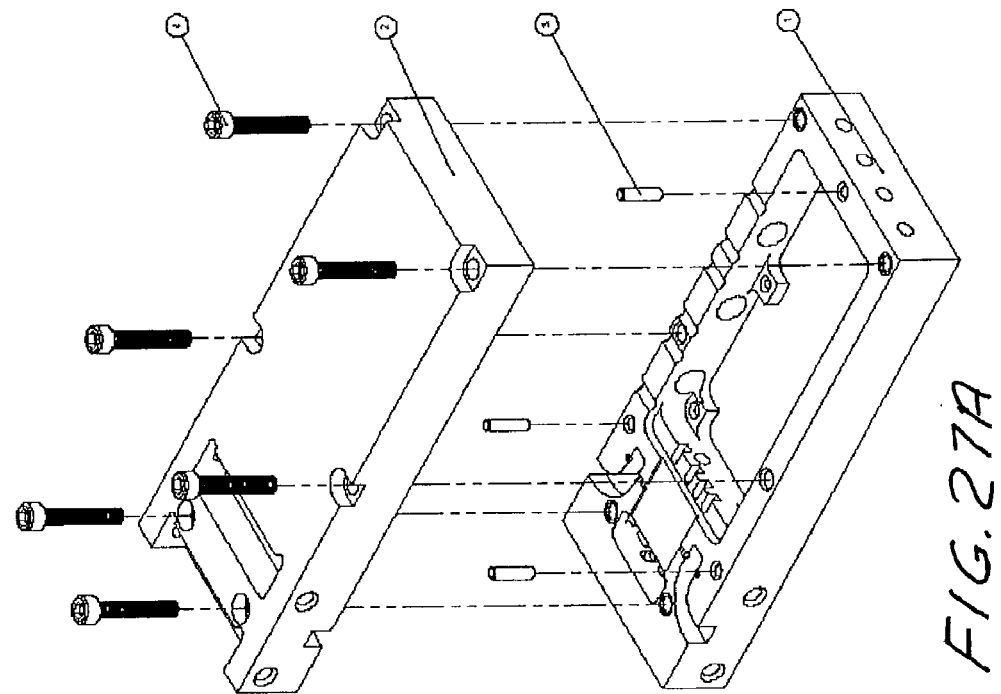
FIG. 27B
FIG. 27A

MILLIMETER WAVE COMMUNICATIONS SYSTEM WITH A HIGH PERFORMANCE MODULATOR CIRCUIT

This application is a continuation in part application of application Ser. No. 09/847,629 filed May 2, 2001, now U.S. Pat. No. 6,556,836 B2; application Ser. No. 10/046,348 filed Oct. 25, 2001 now abandoned, application Ser. No. 10/001,617 filed Oct. 30, 2001, now abandoned; application Ser. No. 09/992,251 filed Nov. 13, 2001, now abandoned; application Ser. No. 10/000,182 filed Dec. 1, 2001, now abandoned; application Ser. No. 10/025,127 filed Dec. 18, 2001 now abandoned, application Ser. No. 10/041,083 filed Jan. 5, 2002, now U.S. Pat. No. 6,611,696 B2; application Ser. No. 10/044,556 filed Jan. 11, 2002, now U.S. Pat. No. 6,587,699 B2; application Ser. No. 10/061,872 filed Jan. 31, 2002, now abandoned; application Ser. No. 10/127,886 filed Apr. 23, 2002 now abandoned; and application Ser. No. 10/196,486 filed Jul. 15, 2002 all of which are incorporated by reference herein.

The present invention relates to communication systems and specifically to high data rate wireless communication systems.

BACKGROUND OF THE INVENTION

Wireless Communication

Point-to-Point and Point-to-Multi-Point

Wireless communications links, using portions of the electromagnetic spectrum, are well known. Most such wireless communication at least in terms of data transmitted is one-way, point to multi-point, which includes commercial radio and television. However there are many examples of point-to-point wireless communication. Mobile telephone systems that have recently become very popular are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Need for High Data Rate Information Transmission

The need for faster information transmission is growing rapidly. Today and into the foreseeable future, transmission of information is and will be digital with volume measured in bits per second. To transmit a typical telephone conversation digitally utilizes about 5,000 bits per second (5 Kbits per second). Typical personal computer modems connected to the Internet operate at, for example, 56 Kbits per second. Music can be transmitted point to point in real time with good quality using mp3 technology at digital data rates of 64 Kbits per second. Video can be transmitted in real time at data rates of about 5 million bits per second (5 Mbits per second). Broadcast quality video is typically at 45 or 90 Mbps. Companies (such as telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit (billion bits, Gbits, per second) range. Most modem trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line. Digital microwave communication has been available since the mid-1970's. Service in the 18–23 GHz radio spectrum is called "short-haul microwave" providing point-to-point service operating between 2 and 7 miles and supporting between four to eight T1 links (each at 1.544 Mbps). Recently, microwave systems operation in the 11 to 38 GHz band have reportedly been designed to transmit at rates up to 155 Mbps (which is a standard transmit frequency known as "OC-3 Standard") using high order modulation schemes.

Data Rate vs. Frequency

Bandwidth-efficient modulation schemes allow, as a general rule, transmission of data at rates of 1 to 10 bits per Hz of available bandwidth in spectral ranges including radio wave lengths to microwave wavelengths. Data transmission requirements of 1 to tens of Gbps thus would require hundreds of MHz of available bandwidth for transmission. Equitable sharing of the frequency spectrum between radio, television, telephone, emergency services, military and other services typically limits specific frequency band allocations to about 10% fractional bandwidth (i.e., a range of frequencies equal to about 10% of center frequency). AM radio's large fractional bandwidth (e.g., 550 to 1650 GHz) is an anomaly; FM radio, at 20% fractional bandwidth, is also atypical compared to more recent frequency allocations, which rarely exceed 10% fractional bandwidth.

Need for High Performance Modulators

As data rates increase so to do the demands on the performance of modulators used in wireless transmitters. Prior art methods of modulating are not sufficient to meet the simultaneous demands for both high data rates and moderately high power output.

Reliability Requirements

Reliability typically required for wireless data transmission is very high, consistent with that required for hardwired links including fiber optics. Typical specifications for error rates are less than one bit in ten billion ($10^{-10}$ bit-error rates), and link availability of 99.999% (5 minutes of down time per year). This necessitates all-weather link operability, in fog and snow, and at rain rates up to 100 mm/hour in many areas.

Weather Conditions

In conjunction with the above availability requirements, weather-related attenuation limits the useful range of wireless data transmission at all wavelengths shorter than the very long radio waves. (See FIG. 16.) Typical ranges in a heavy rainstorm for optical links (such as laser communication links) are 100 meters and for microwave links, 10,000 meters.

Atmospheric attenuation of electromagnetic radiation increases generally with frequency in the microwave and millimeter-wave bands. However, excitation of rotational transitions in oxygen and water vapor molecules causes absorption of radiation preferentially in bands near 60 and 118 GHz (oxygen) and near 23 and 183 GHz (water vapor). Rain attenuation, through large-angle scattering, increases monotonically with frequency from 3 to nearly 200 GHz. At the higher, millimeter-wave frequencies, (i.e., 30 GHz to 300 GHz corresponding to wavelengths of 10 millimeters to 1 millimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

What is needed are high data rate wireless communication links capable of efficient use of available millimeter wave spectra.

SUMMARY OF THE INVENTION

The present invention provides a high data rate communication system operating at frequencies greater than 70 GHz and at data rates of about 1.25 Gbps or greater. Preferred embodiments include modulators with a resonant LC circuit including a diode that is back-biased for "off" (i.e., no transmit) and forward-biased for "on" (or transmit). The modulator is a part of high performance transceivers for wireless, millimeter wave communications links. A preferred embodiment provides a communication link of more than eight miles which operates within the 71 to 76 GHz portion of the millimeter spectrum and provides data transmission rates of 1.25 Gbps with bit error rates of less than $10^{-10}$. A first transceiver transmits at a first bandwidth and receives at a second bandwidth both within the above spectral range. A second transceiver transmits at the second bandwidth and receives at the first bandwidth. The transceivers are equipped with antennas providing beam divergence small enough to ensure efficient spatial and directional partitioning of the data channels so that an almost unlimited number of transceivers will be able to simultaneously use the same spectrum. In a preferred embodiment the first and second spectral ranges are 71.8+/−0.63 GHz and 73.8+/−0.63 GHz and the half power beam width is about 0.2 degrees or less. Preferably, a backup transceiver set is provided which would take over the link in the event of very bad weather conditions. In other embodiments especially useful for mobile applications at least one of the transceivers includes a GPS locator.

BRIEF DESCRIPTION OF THE DRAWINGS

FIGS. 13A and 13B depict two data links operating on a non-interfering basis (13A) and in a situation in which interference may be present (13B).

FIGS. 18A and 18B show the I/O circuit board 70.

FIGS. 19A and 19B show signal conditioning & clock recovery circuit board 71.

FIGS. 21A and 21B shows the IF circuit board 80.

FIGS. 27A and 27B show details of low-noise amplifier 10.

DETAILED DESCRIPTION OF PREFERRED EMBODIMENTS

Need for High Data Rate Transceivers

The value of a wireless communications link depends on many factors including the distance over which it can reliably operate. The longer the operational range of a set of hardware for a communications link, the greater its potential economic value. While the same hardware can be applied to short-range situations (corresponding to reduced economic value) when the hardware is applied to longer-range situations the higher economic values can be realized. For comparison, optical fiber typically costs $500,000 per mile or more to install in a metropolitan environment. Thus for situations requiring a large amount of bandwidth (large compared with the capability of twisted copper pairs and low frequency wireless), but not so large as to require more than about 1 gigabit per second, the instant invention has an economic value which can approach the cost of optical fiber. Thus an approximately 1 gigabit per second wireless link can approach a competitive worth of about 2.5 million dollars if it can operate over a 5 mile distance or 5 million dollars if it can operate over a 10 mile distance. Thus longer range is economically very desirable.

With the goal of providing high data rate links (e.g., 1.25 Gbs) over long distances (of the order of 10 miles (16 km)), it is informative to calculate the amount of signal loss naturally occurring over such a long distance. Assuming operation at about 73 GHz at sea level with 85% relative humidity at 25° C., using 1.2-meter (4-foot) diameter antennas at both end implies a signal loss of 60 dB for a 10 mile (16 km) link.

Prototype Demonstration

A prototype demonstration of the millimeter-wave transmitter and receiver useful for the present invention is described by reference to FIGS. 1 to 7. With this embodiment the Applicants have demonstrated digital data transmission in the 71 to 76 GHz range at 1.25 Gbps with a bit error rate below $10^{-12}$.

Transceiver System

Figure 1:
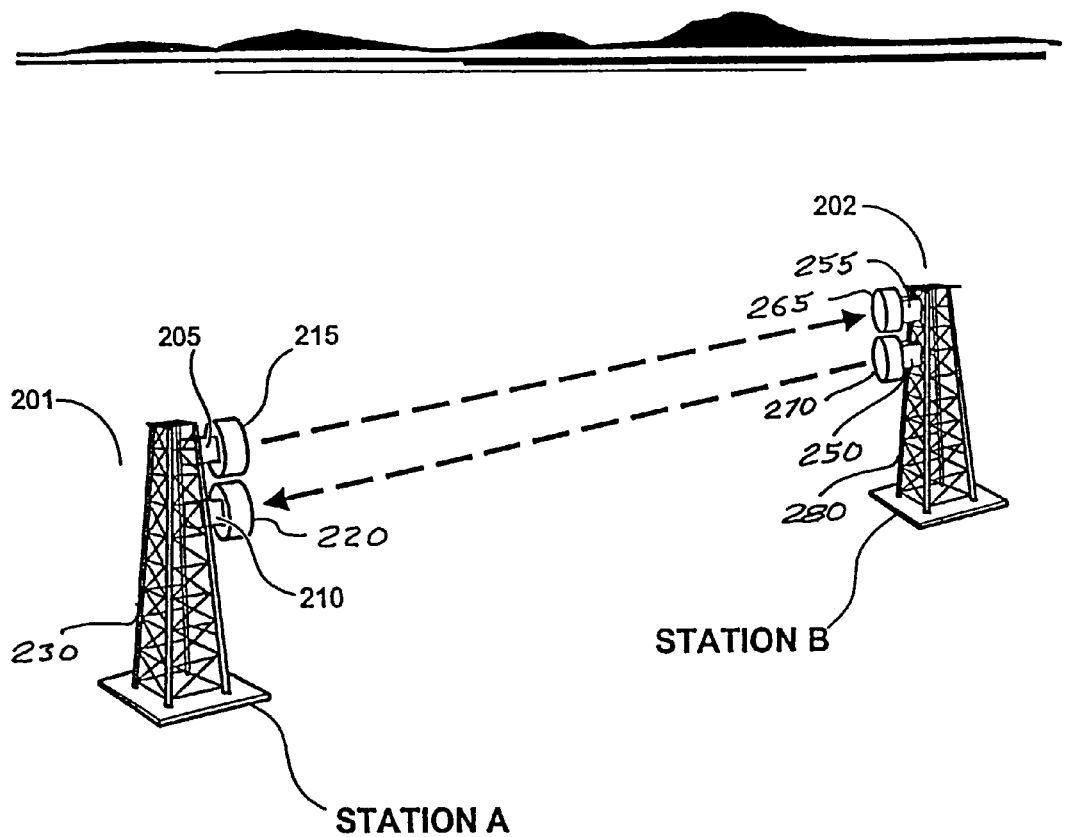
FIG. 1 is a sketch of a full duplex millimeter wave link.

FIG. 1 shows how a full duplex wireless data link between Station A and Station B is accomplished by using a mm-wave transceiver at each station site. The transceiver hardware comprises a millimeter wave transmitter and receiver pair including a pair of millimeter-wave antennas. The millimeter-wave transmitter signal is amplitude modulated with a high-speed diode switch. The receiver includes a millimeter-wave down converter that translates the received signal spectrum from 71.8–73.8 GHz frequencies to a 2.0±0.625 GHz intermediate frequency (IF) range. It also includes an automatic gain control circuit (AGC), detector, and data/clock recovery circuit to extract base-band digital data sent by the transmitter.

Figure 3A:
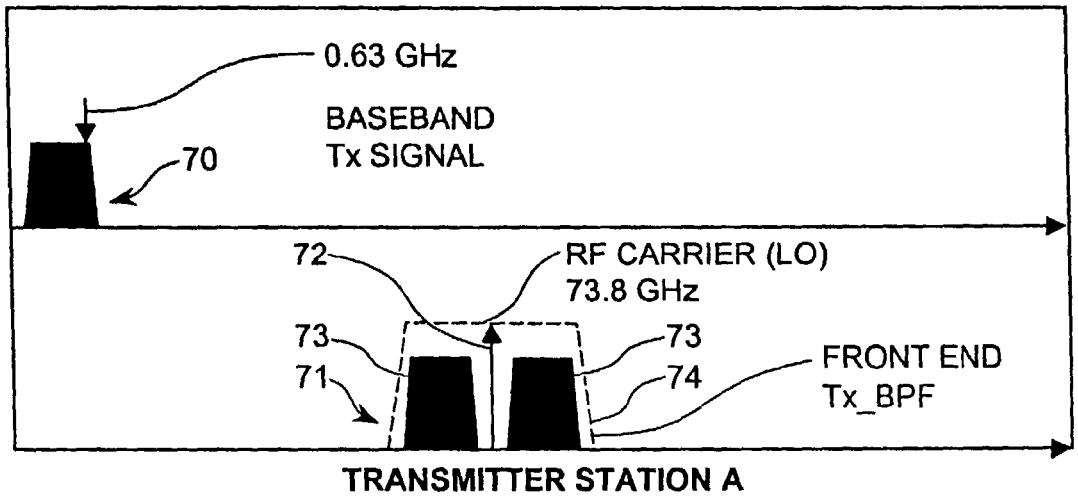
FIGS. 3A and 3B show spectrum plan of 1.25 Gbps digital radio operating at 71.8–73.8 GHz frequencies.
Figure 3B:
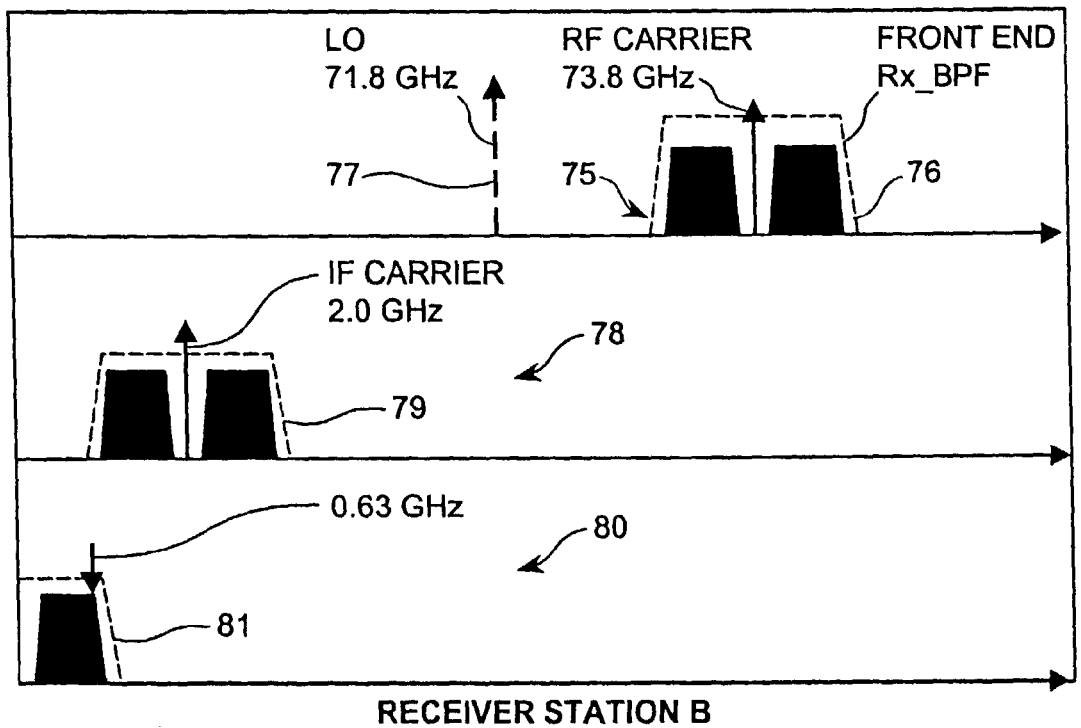

Millimeter wave hardware used to support full duplex wireless link comprises two transmitter-receiver pairs operating in parallel. The transmitter at Station A transmits at 73.8 GHz center frequency and the receiver at Station B uses a local oscillator at 71.8 GHz to down convert an incoming radio signal to an intermediate frequency (IF) centered at 2 GHz. The transmitter at Station B transmits at 71.8 GHz center frequency and a 73.8 GHz local oscillator is used in the receiver at Station A. In both cases the IF frequency remains centered at the same 2 GHz frequency. Each transceiver uses a single mm-wave local oscillator for both transmitter and receiver circuits, but the frequency used in Stations A and B differ by 2 GHz as shown in FIGS. 3A and 3B.

Millimeter Wave Link Configuration

A sketch of a full-duplex wireless link between stations A and B is shown in FIG. 1. In a preferred embodiment, the link is formed using millimeter wave transceivers designated as 201 and 202, one transceiver per station. The transceiver at station A comprises a transmitter 205 and a receiver 210 that are connected to parabolic dish antenna 215 and parabolic dish antenna 220, respectively. The transceiver at station A is attached to a rigid support structure 230. The hardware configuration of station B is similar to that of station A. A transceiver at station B comprises a transmitter 250 and a receiver 255 that are connected to parabolic dish antenna 270 and parabolic dish antenna 265, respectively. The transceiver at station B is attached to a rigid support structure 280. A millimeter wave signal transmitted from Station A to Station B has a center frequency at 73.8 GHz and a signal transmitted from Station B to Station A is centered at 71.8 GHz. The signals transmitted in opposite directions have polarization perpendicular to each other to further reduce cross talk interference.

Millimeter Wave Transmitters and Receivers

Figure 2A:
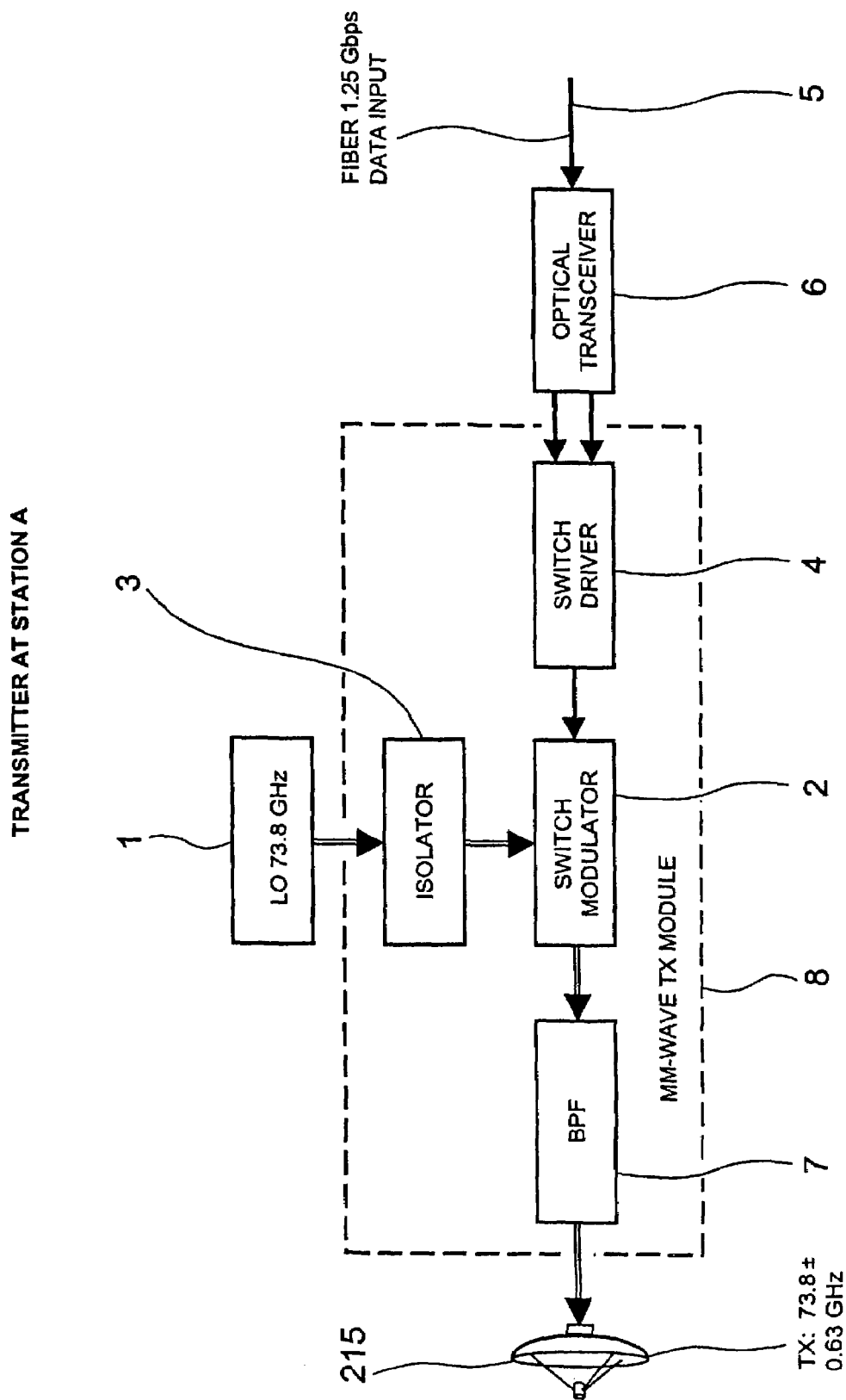
FIG. 2A is a block diagram showing a 1.25 Gbps transmitter operating at millimeter-wave frequencies.
Figure 2B:
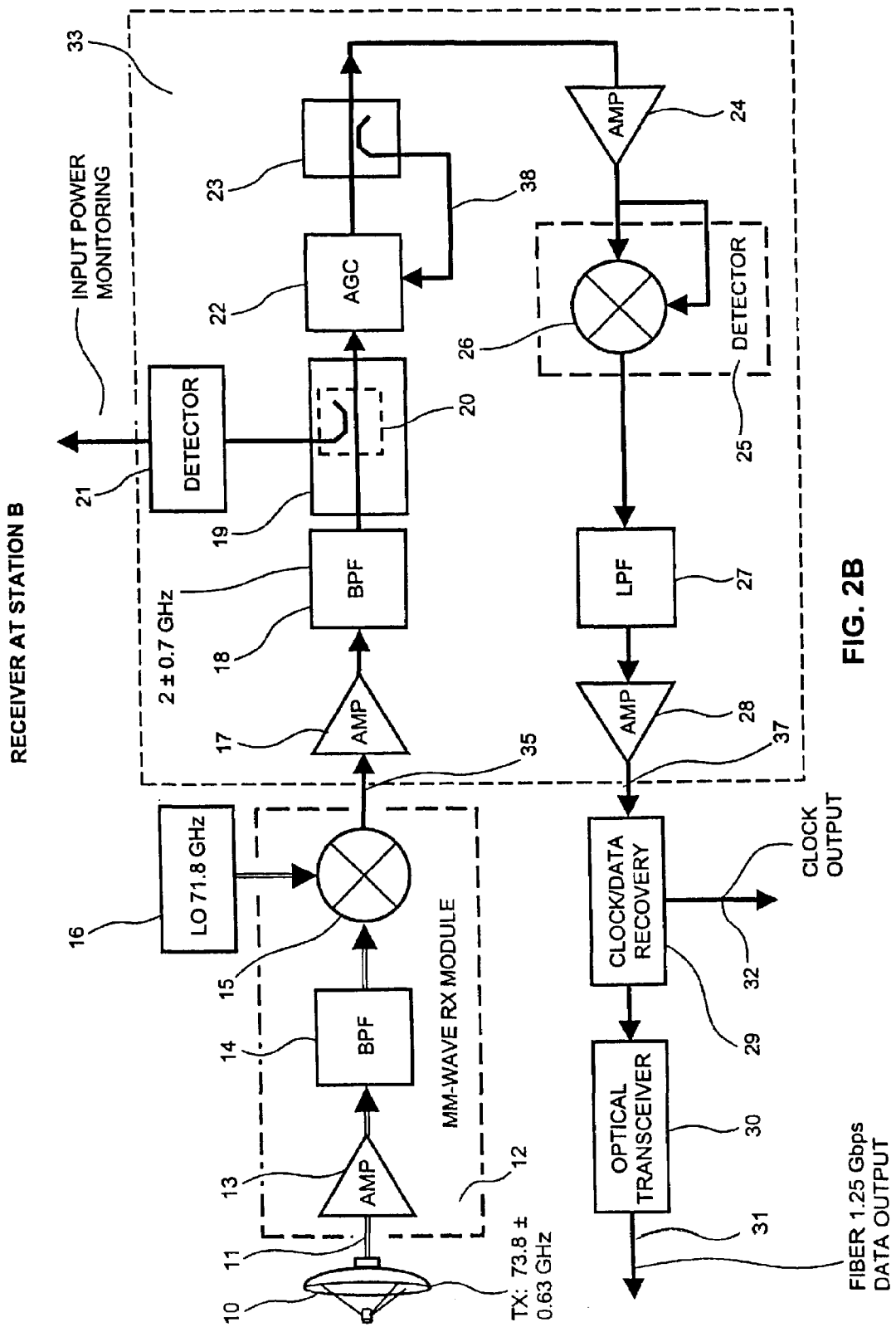
FIG. 2B is a block diagram showing a 1.25 Gbps receiver operating at millimeter-wave frequencies.

A one-way digital wireless link is supported by a millimeter-wave transmitter located at Station A and a receiver located at station B. A block diagram of the transmitter is shown in FIG. 2A. A block diagram of the receiver is illustrated in FIG. 2B. In the transmitter, the transmit power is generated with a cavity-tuned Gunn diode local oscillator (LO) 1 resonating at 73.8 GHz (available, for example, as Model GE-738 from Spacek Labs Inc., Santa Barbara, Calif.). The power from LO 1 is amplitude modulated by a fast diode switch modulator 2. The modulator allows at least 15 dB modulation depth, which is adjusted to optimize link performance. Isolator 3 (available, for example, as Model WJE-WI from MRI Inc., Chino, Calif.) disposed between modulator 2 and LO 1 prevents power reflected by the switch modulator 2 from entering and affecting LO 1. The diode switch modulator 2 is controlled by switch driver 4 at 1.25 Gigabit per second data rate in accordance with the Gigabit-Ethernet standard (802.3z by the IEEE Standards Association). The modulating signal is brought in on optical fiber 5, converted to an electrical signal in optical transceiver 6 (for example, a Finisar model FTRJ-8519-1 operating at 850 nm optical wavelength). The amplitude-modulated mm-wave signal is filtered in a 1.6 GHz wide pass-band between 73 and 74.6 GHz using wave-guide band pass filter 7 (such as a septum or E-plane wave-guide filter). Components 2, 3, 4 and 7 are packaged in a millimeter-wave module 8. A heat sink is provided to the module and each component to reduce temperature drift of their characteristics. From the waveguide filter 7, the millimeter wave signal propagates to a Cassegrain dish antenna 215 where it is radiated into free space with vertical polarization.

The receiver at station B as shown in FIG. 2B collects incoming vertical polarized millimeter wave power with a Cassegrain antenna 10 (available, for example as Model CRA-R48 G from Millitech) and channels it into wave guide 11 that connects to a millimeter-wave receiver module 12. At the front end of the receiver is a 20 dB gain low noise amplifier 13. After amplification, the signal is passed on to a waveguide band pass filter 14 that rejects signal outside the 73–74.6 GHz frequency band. This filtered signal is then down converted to a 2.+−.0.625 GHz intermediate frequency band using a mixer 15 (available, for example, as Model M74-2 from Spacek Labs Inc., Santa Barbara, Calif.) and local Gunn oscillator 16 operating at 71.8 GHz frequency (available, for example, as Model GE-718 from Spacek Labs Inc., Santa Barbara, Calif.). The resulting intermediate frequency (IF) signal 35 is converted into a base band signal 37 in IF circuit 33. In the IF circuit 33 the intermediate frequency signal 35 is amplified by amplifier 17 (available, for example, as Model ERA-1, MiniCircuits, Brooklyn, N.Y.) and filtered by a microstrip band pass filter 18 having a pass-band between 1.2 and 2.8 GHz. The filter 18 has flat group delay response with less than then 100 ps delay time variation within its passband to minimize time jitter in the transmitted digital signal. A small fraction of the signal is picked off a niicrostrip line 19 with a coupler 20 (available, for example, as Model D18P from MiniCircuits, Brooklyn, N.Y.) and converted into low frequency voltage by a detector 21 (available, for example, as Model DTM 180 from Herotek Inc., San Jose, Calif.) for the purpose of monitoring signal power. The remaining signal is directed to an automatic gain control circuit (AGC) 22 (available, for example, as Model HMC346 MS8G from Hittite Corp., Chelinsford, Mass.) that maintains stable power output for the input power variations as large as 30 dB. A signal-level feedback 38 for AGC 22 is provided by coupler 23. An amplifier 24 brings signal power to a level required for proper operation of a detector which includes mixer 26. A custom microwave detector circuit is required to provied the 700 MHz of video bandwidth. The base band component of the resulting detected signas is separated from the high frequency components by a low pass filter (Pass band DC-1000 MHz) 27 (available, for example, as Modes SCLF-1000 form MiniCircuits, Brooklyn, N.Y.) and amplidied in amplifier 28 to a level adequate for further processing. The filtered base band signal 37 enters clock and data recovery circuit 29 (availabe, for example, as Modes VSC8122 from Vitesse Semiconductor Corp., Camarillo, Calif.) for conditioning. Data output of the data recovery circuit 29 is connected to optical transceiver 30 (available, for example, as Model FTRJ-8519 from Finisar Corp., Sunnyvale, Calif.) that converts the electrical voltage signals into opical data signals, which are transmitted through optical fiber cable 31. Clock output 32 of the clock/data recovery circuit is provide for circuit testing purposes.

Signal spectrum transformation from the base band input at the Transmitter A to the base band output at the Receiver B is illustrated in FIGS. 3A and 3B. At a 1.25 Gbps data rate, the base-band signal spectrum occupies a frequency band 70 from approximately 120 MHz to approximately 630 MHz (0.63 GHz). With signal spectrum limited to this frequency band by a filter, the 1.25 Gbps data rate consisting of alternating high and low voltage levels will correspond to a sinusoidal signal at 625 MHz frequency. An output spectrum 71 of transmitter at station A comprises a center carrier 72 at 73.8 GHz and two side bands 73 that mirror the base band signal relative to the center carrier. The strength of the center carrier relative to the strength of the side bands can be adjusted by changing the modulation depth of the signal in modulator 2. The bandwidth of the transmitted signal is limited by the waveguide band pass filter 7 with characteristics shown as 74. As signal from transmitter A arrives at the receiver B its spectrum shape 75 remains similar to that of transmitted signal 71. After amplification by low noise amplifier 13 much of the white thermal noise is removed from the spectrum by the receiver band pass filter 14 whose characteristic is shown as 76. Local oscillator signal of the receiver at 71.8 GHz is shown as 77. In millimeter-wave mixer 15 the received signal having spectrum 75 and local oscillator having spectrum 77 interact to produce intermediate frequency spectrum 78. The intermediate frequency spectrum 78 is a replica of spectrum 75 translated to lower frequencies. The intermediate frequency spectrum 78 is centered at 2 GHz and is band-limited with filter 18 to remove all other spectral components to provide a filter characteristic 79. Upon detection, the intermediate spectrum 78 is transformed into a base band spectrum 80 and is limited with low pass filter 27 to retain signal components contained in the original transmitted 1.25 Gbps digital signal. The low-pass filter 27 characteristic is shown as 81.

Figure 4A:
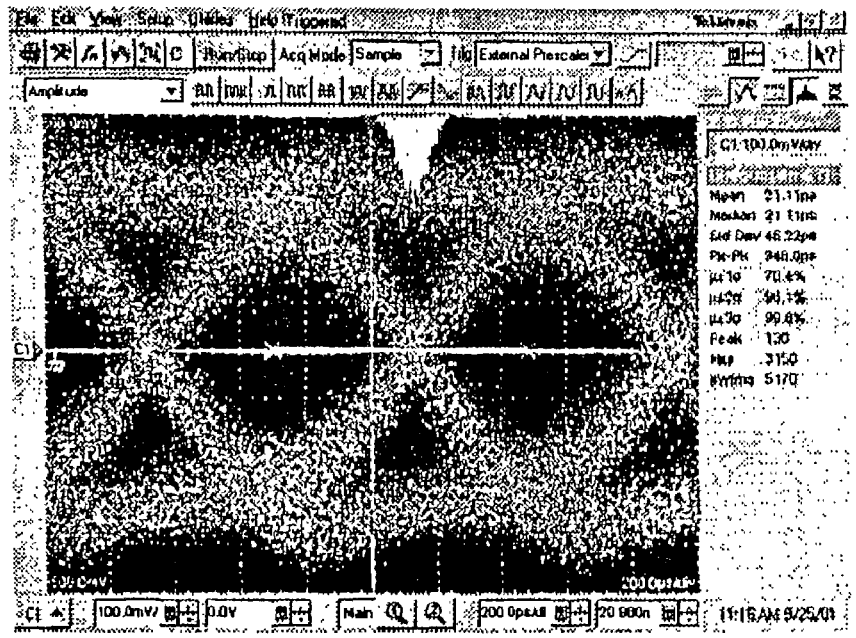
FIGS. 4A and 4B are measured output voltages (eye diagrams) from a millimeter-wave receiver at 60 dB signal attenuation and 1.25 Gbps data rate.
Figure 4B:
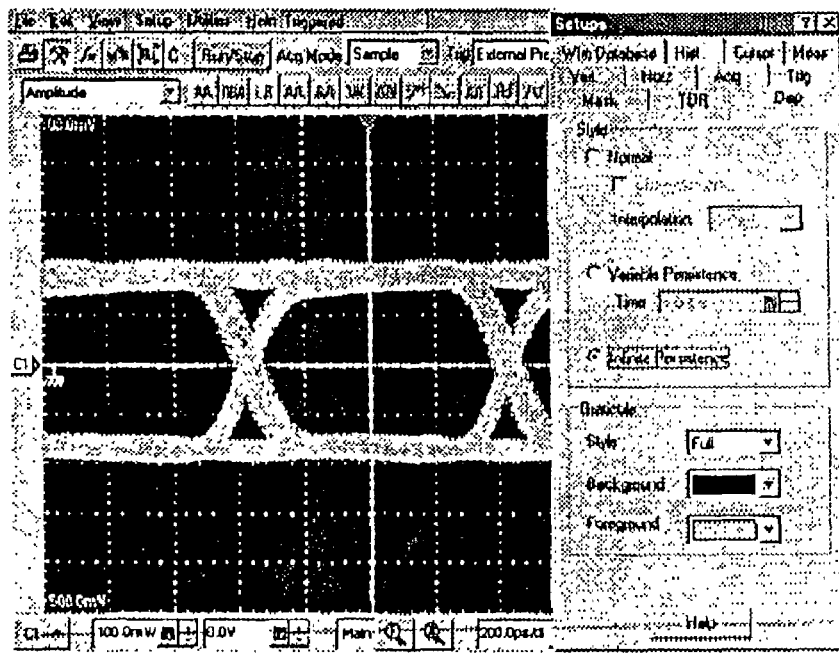

FIGS. 4A and 4B show measured eye diagrams of a 1.25 Gbps pseudo random bit stream (PRBS7) digital signal transmitted from Transmitter A and received by Receiver B. The raw detected signal attenuated by 60 dB as it propagated between stations A and B is shown in FIG. 4A. In spite of the noise present, the embedded signal was recovered with $10^{-10}$ bit error rate (BER). Similar measurements with somewhat less signal attenuation, 58 dB, gave BER results of $10^{-12}$. Data/clock recovery circuit 29, as shown in FIG. 2B, takes the raw detected signal and converts into a cleaner signal with low jitter as shown in FIG. 4B without considerably affecting its BER characteristics. The data/clock recovery circuit 29 provides a standardized output compatible with optical networking equipment.

Another one-way link is used to complement the above-described unidirectional link to create a full-duplex link shown in FIG. 1. The transmitter and receiver configuration used in this second link is similar to that shown in FIGS. 2A and 2B. It differs from the one shown in FIG. 2A in that the local oscillator of transmitter located at Station B resonates at the frequency 71.8 GHz, while the local oscillator in the receiver located at Station A resonates at the frequency 73.8 GHz and the mm-wave signal propagating from Station B to Station A is horizontally rather than vertically polarized. A person skilled in the art would also appreciate that band pass characteristics of the millimeter wave components used in the millimeter-wave modules 8 and 12 including band pass filters, low noise amplifier and mixer need to be adjusted accordingly to accommodate 1.25 Gbps signals with center frequencies determined by the local oscillators used in the second link.

Separate Antennas Transceiver Configuration

Figure 5:
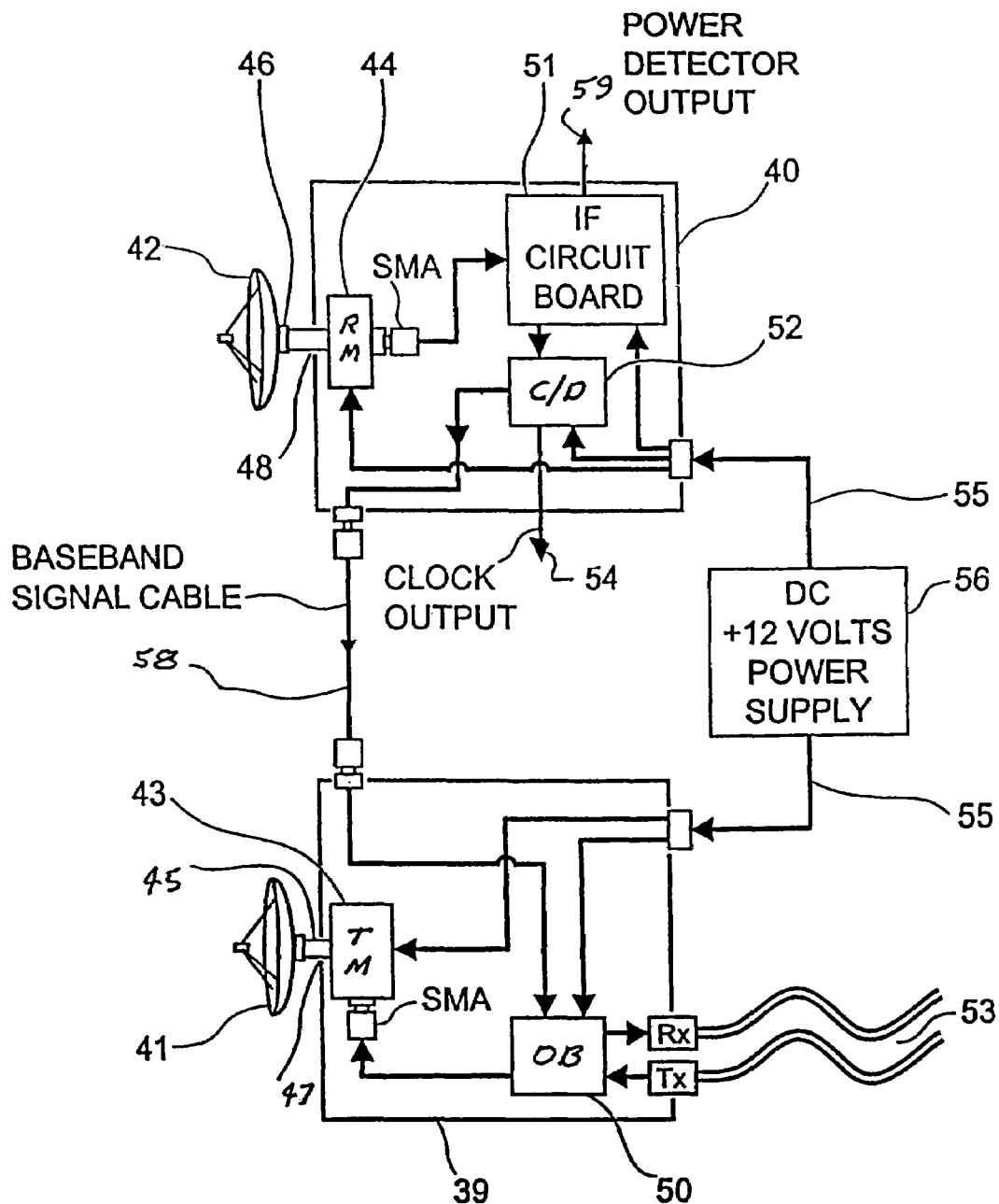
FIG. 5 is a block diagram showing layout of a separate transmit and receive antenna configuration.

In the separate-antennas transceiver configuration shown in FIG. 1 each of the receivers and transmitters uses individual antennas for millimeter wave signal transmission and reception. This configuration maximizes signal isolation between receiver and transmitter deployed in the same location as shown in FIG. 1. FIG. 5 shows the transceiver hardware layout and connections for such configuration. Electronic components of the transceiver are protected by hermetically sealed metal transmitter enclosure 39 and receiver enclosure 40. Parabolic transmitting antenna 41 and receiving antenna 42 are attached to the enclosures and antenna horns 45 and 46 connect to millimeter wave transmitter module 43 and receiver module 44 via hermetically sealed ports 47 and 48 in the enclosures 39 and 40 respectively. Electric power to the transceiver is provided by an external +12 Volts power supply 56. Millimeter wave transmitter module 43 and optical board 50 that provides modulating input for the transmitter are packaged inside transmitter enclosure 39. Optical board 50 converts optical signal brought in on fiber 53 into voltage signal.

Millimeter-wave receiver module 44, intermediate frequency board 51, clock/data recovery circuit board 52 and optical circuit board (not shown) are disposed inside receiver enclosure 40. An intermediate frequency signal detected by the IF board 51 is conditioned in the clock recovery board 52 and then transmitted by optical circuit board (not shown) into fiber 58. Hermetically sealed connectors attached to the enclosures provide power input and signal input/output from/to externally connected optical fiber 53 and optical fiber 58, power detector output 59, clock output 54 and power cables 55. RFI/EMI filters (not shown) protect receiver and transmitter circuits against external interference induced in the power cables 55.

Single Antenna Transceiver Configuration

Figure 6:
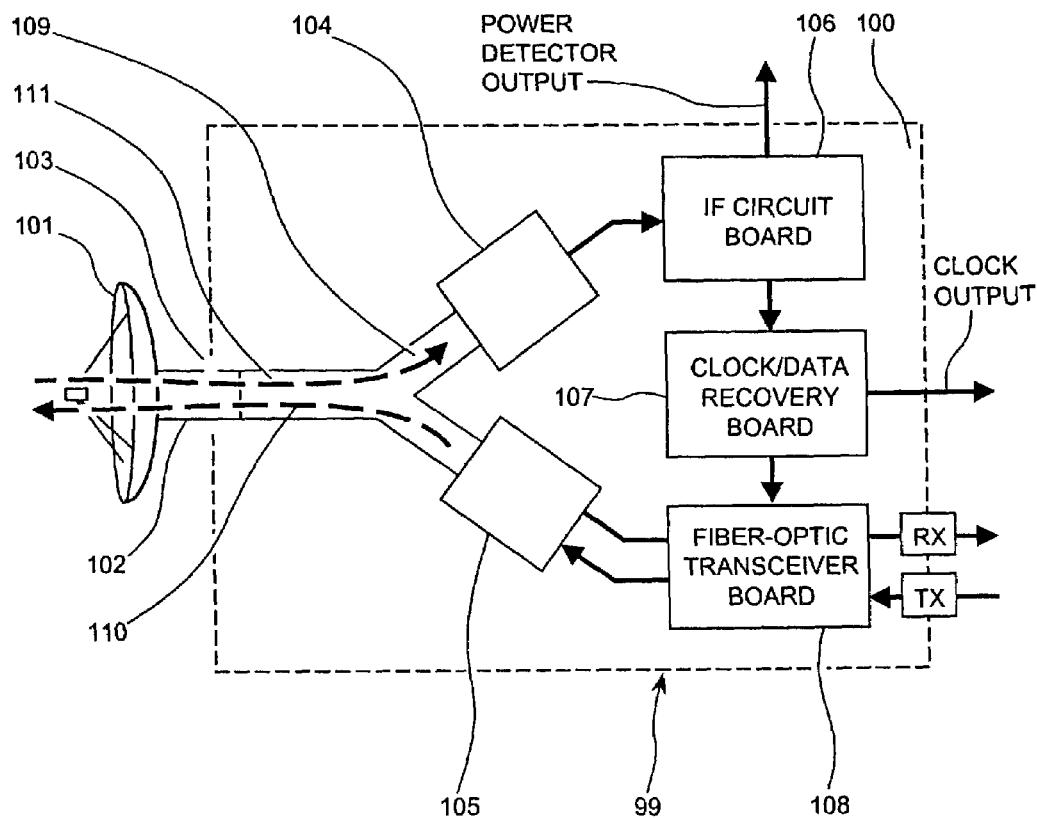
FIG. 6 is a block diagram showing layout of a single-antenna configuration millimeter-wave transceiver.

In another embodiment, called a single antenna configuration, both transmitter and receiver use a common dish antenna at each station location. An example of a single antenna configuration is shown in FIG. 6 as 99. In a single antenna configuration electronic components of both transmitter and receiver are packaged inside the same hermetically sealed transceiver enclosure 100. Receiving and transmitting antenna 101 has horn 102 that communicates with the millimeter wave components inside the enclosure via hermetically sealed port 103. Millimeter-wave receiver 104 and transmitter 105 modules, IF receiver 106, clock/data recovery 107 and fiber/optic transceiver 108 boards are similar to those used in the separate antennas transceiver configuration. To transmit and receive signals with a single antenna, transceiver 99 includes a duplexer component 109 disposed between the antenna horn and millimeter wave transmitter and receiver modules. Duplexer 109 channels millimeter-wave power 110 generated by the transmitter 105 to the antenna horn and simultaneously prevents it from entering receiver 104. The received power 111 is directed to the receiver 104 and does not enter transmitter. An off-the-shelf component that can be used for duplexer 109 is orthomode transducer such as model OMT-12RR125 manufactured by Millitech Corp. The OMT can provide at least 25 dB isolation between receiver and transmitter ports.

Measured Path Loss

Figure 7:
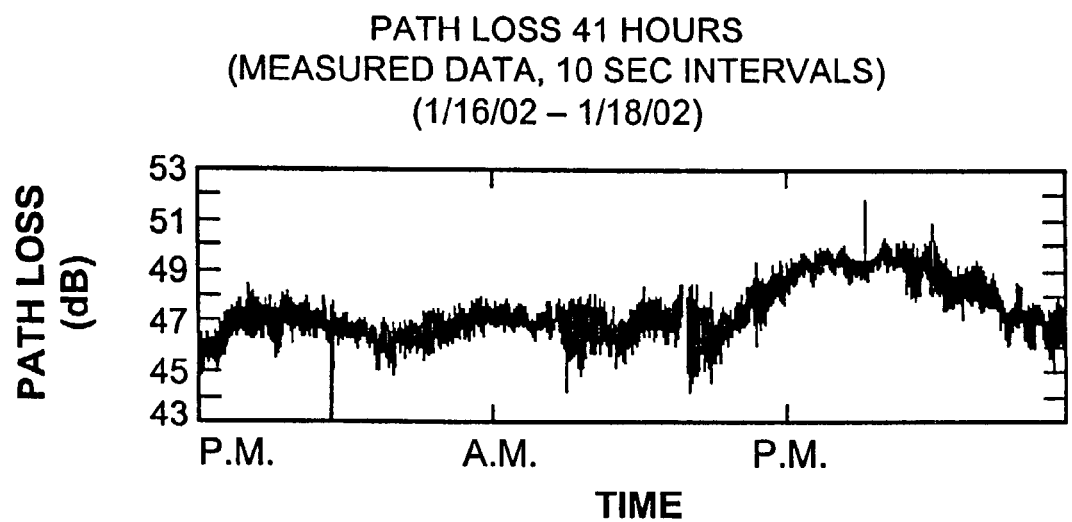
FIG. 7 displays path loss over a 41-hour period for a prototype demonstration.

FIG. 7 shows measured data for the path loss of communication link incorporating the radio transceiver of the instant invention. The data span a 41-hour period and were taken at 10-second intervals. The link spanned a distance of 8 miles (13 km). The variations in link loss demonstrated in FIG. 7 are primarily due to weather variations over time (dominated by humidity changes).

Very Narrow Beam Width

A dish antenna of four-foot diameter projects a half-power beam width of about 0.2 degrees at 72 GHz. The full-power beam width (to first nulls in antenna pattern) is narrower than 0.45 degrees. This suggests that about 800 independent beams could be projected azimuthally around an equator from a single transmitter location, without mutual interference, from an array of 4-foot dishes. At a distance of ten miles, two receivers placed 400 feet apart can receive independent data channels from the same transmitter location. Conversely, two receivers in a single location can discriminate independent data channels from two transmitters ten miles away, even when the transmitters are as close as 400 feet apart. Larger dishes can be used for even more directivity.

Rigid Antenna Support

A communication beam having a half-power beam width of only about 0.2 degrees requires an extremely stable antenna support. Prior art antenna towers such as those used for microwave communication typically are designed for angular stability of about 0.6 to 1.1 degrees or more. Therefore, the present invention requires much better control of beam direction. For good performance the receiving antenna should be located at all times within the half power foot print of the transmitted beam. At 10 miles the half power footprint of a 0.2-degree beam is about 150 feet. During initial alignment the beam should be directed so that the receiving transceiver antenna is located approximately at the center of the half-power beam width footprint area. The support for the transmitter antenna should be rigid enough so that the beam direction does not change enough so that the receiving transceiver antenna is outside the half-power footprint. Thus, in this example the transmitting antenna should be directionally stable to within +/−0.09 degrees.

This rigid support of the antenna not only assures continued communication between the two transceivers as designed but the narrow beam widths and rigid antenna support reduces the possibility of interference with any nearby links operating in the same spectral band.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7–11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available off-the-shelf from vendors such as Western Multiplex Corporation (Models Lynx DS-3, Tsunami 100BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7–11.7 GHz band.

Sensing of a millimeter wave link failure and switching to redundant microwave channel is an existing automated feature of the network routing switching hardware available off-the-shelf from vendors such as Cisco, Foundry Networks and Juniper Networks.

Narrow Beam Width Antennas

The narrow antenna beam widths afforded at millimeter-wave frequencies allow for geographical portioning of the airwaves, which is impossible at lower frequencies. This fact eliminates the need for band parceling (frequency sharing), and so enables wireless communications over a much larger bandwidth, and thus at much higher data rates, than were ever previously possible at lower RF frequencies.

The ability to manufacture and deploy antennas with beam widths narrow enough to ensure non-interference, requires mechanical tolerances, pointing accuracies, and electronic beam steering/tracking capabilities, which exceed the capabilities of the prior art in communications antennas. A preferred antenna for long-range communication at frequencies above 70 GHz has gain in excess of 50 dB, 100 times higher than direct-broadcast satellite dishes for the home, and 30 times higher than high-resolution weather radar antennas on aircraft. However, where interference is not a potential problem, antennas with dB gains of 40 to 45 may be preferred.

Most antennas used for high-gain applications utilize a large parabolic primary collector in one of a variety of geometries. The prime-focus antenna places the receiver directly at the focus of the parabola. The Cassegrainian antenna places a convex hyperboloidal secondary reflector in front of the focus to reflect the focus back through an aperture in the primary to allow mounting the receiver behind the dish. (This is convenient since the dish is typically supported from behind as well.) The Gregorian antenna is similar to the Cassegrainian antenna, except that the secondary mirror is a concave ellipsoid placed in back of the parabola's focus. An offset parabola rotates the focus away from the center of the dish for less aperture blockage and improved mounting geometry. Cassegrainian, prime focus, and offset parabolic antennas are the preferred dish geometries for the MMW communication system.

A preferred primary dish reflector is a conductive parabola. The preferred surface tolerance on the dish is about 15 thousandths of an inch (15 mils) for applications below 40 GHz, but closer to 5 mils for use at 72 GHz. Typical hydroformed aluminum dishes give 15-mil surface tolerances, although double-skinned laminates (using two aluminum layers surrounding a spacer layer) could improve this to 5 mils. The secondary reflector in the Cassegrainian geometry is a small, machined aluminum "lollipop" which can be made to 1-mil tolerance without difficulty. Mounts for secondary reflectors and receiver waveguide horns preferably comprise mechanical fine-tuning adjustment for in-situ alignment on an antenna test range.

Flat Panel Antenna

Another preferred antenna for long-range MMW communication is a flat-panel slot array antenna such as that described by one of the present inventors and others in U.S. Pat. No. 6,037,908, issued Mar. 14, 2000, which is hereby incorporated herein by reference. That antenna is a planar phased array antenna propagating a traveling wave through the radiating aperture in a transverse electromagnetic (TEM) mode. A communications antenna would comprise a variant of that antenna incorporating the planar phased array, but eliminating the frequency-scanning characteristics of the antenna in the prior art by adding a hybrid traveling-wave/corporate feed. Flat plates holding a 5-mil surface tolerance are substantially cheaper and easier to fabricate than parabolic surfaces. Planar slot arrays utilize circuit-board processing techniques (e.g., photolithography), which are inherently very precise, rather than expensive high-precision machining.

Coarse and Fine Pointing

Pointing a high-gain antenna requires coarse and fine positioning. Coarse positioning can be accomplished initially using a visual sight such as a bore-sighted riflescope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Modulators

Prior Art Modulators

Figure 8A:
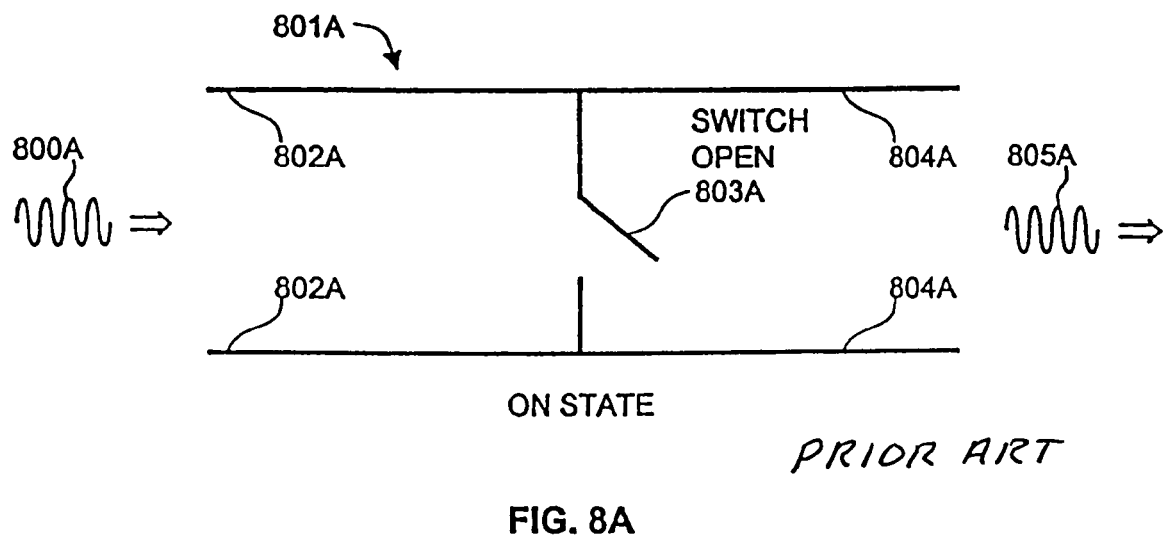
FIGS. 8A and 8B show features of a prior art modulator.
Figure 8B:
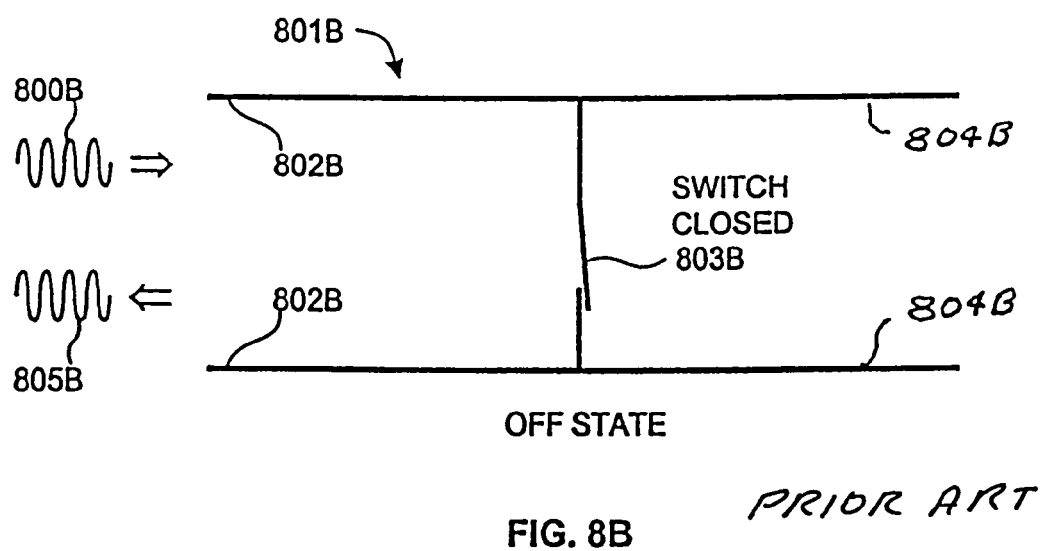

FIGS. 8A and 8B shows a highly simplified schematic of a conventional prior art RF modulator in two different states, "on" and "off", respectively. An RF signal 800A enters transmission line 801A from the left at port 802A. A modulator switch 803A, shown in the switch-open state, or "on" state, in FIG. 8A, is used to control the amount of RF signal 805A, that continues along transmission line 801A and on to exit to the right at port 804A.

FIG. 8B shows the modulator in the switch-closed, or "off" state. In this case, switch 803B acts as a short circuit on the transmission line 801B, hence causing the RF power 800B to reflect back toward port 802B and producing a greatly diminished signal at port 804B. This is the essence of the operation of most prior art modulators.

So long as the frequencies of operation (both modulation rate and RF frequency) are kept low enough, the conventional modulator of FIGS. 8A and 8B perform satisfactorily. However, when either of the modulation rate or RF frequency increase to the range of about 50 GHz, these conventional modulators suffer diminished performance.

Figure 9A:
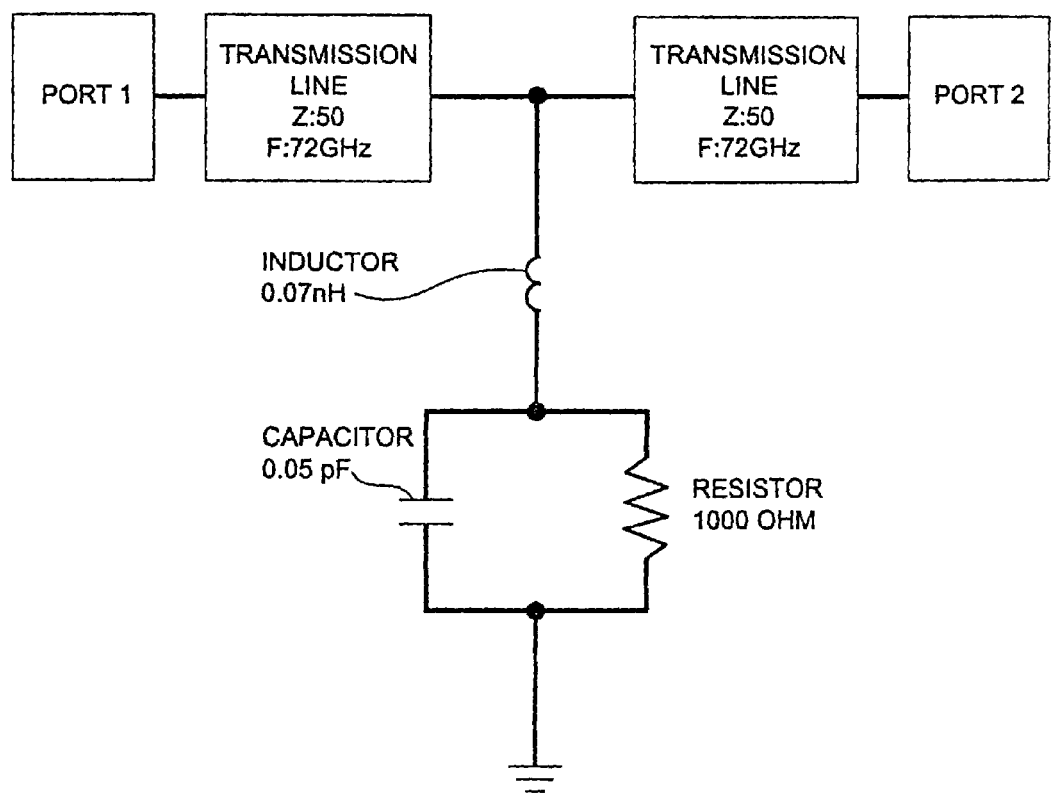
FIGS. 9A and 9B and FIGS. 10A and 10B show the results of one attempt to construct a high frequency RF communication system using a diode which is back-biased for "on" and forward biased for "off".
Figure 9B:
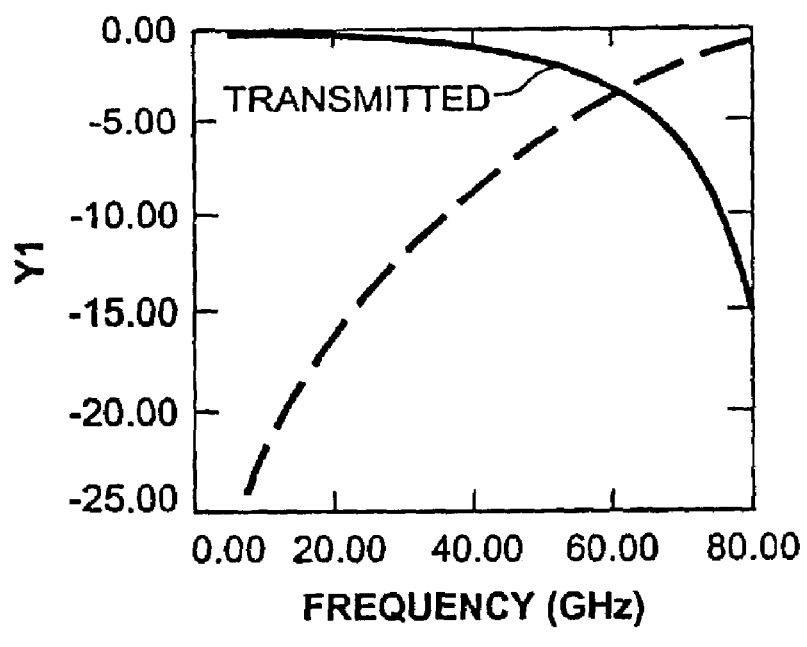

FIG. 9A shows a simplified schematic of a diode-based modulator that operates well in the range of 60 to 120 GHz. In this embodiment a diode MA 4E2038, available from M/A-COM, at Lowell, Mass. or equivalent is modified for use in a high frequency communication module. FIG. 9B shows the simulated transmission and reflection signals for this diode in a back-biased, switch-open state. At low frequency, the transmission is very high, and the reflection is very low. Unfortunately, when one looks at the higher frequencies, the performance of this diode switch degrades rapidly as 60 GHz is approached. At this frequency, the amount of reflection becomes comparable with the amount of transmission and hence the notion of a good "on" state becomes seriously compromised.

Figure 10A:
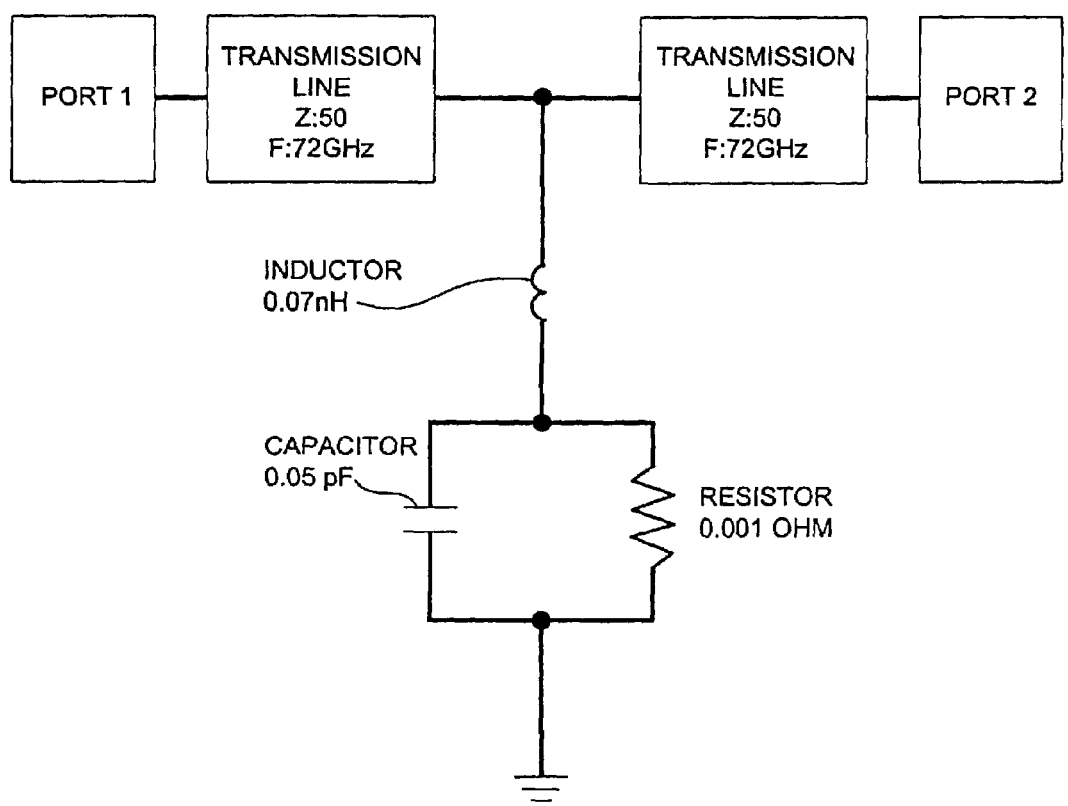
Figure 10B:
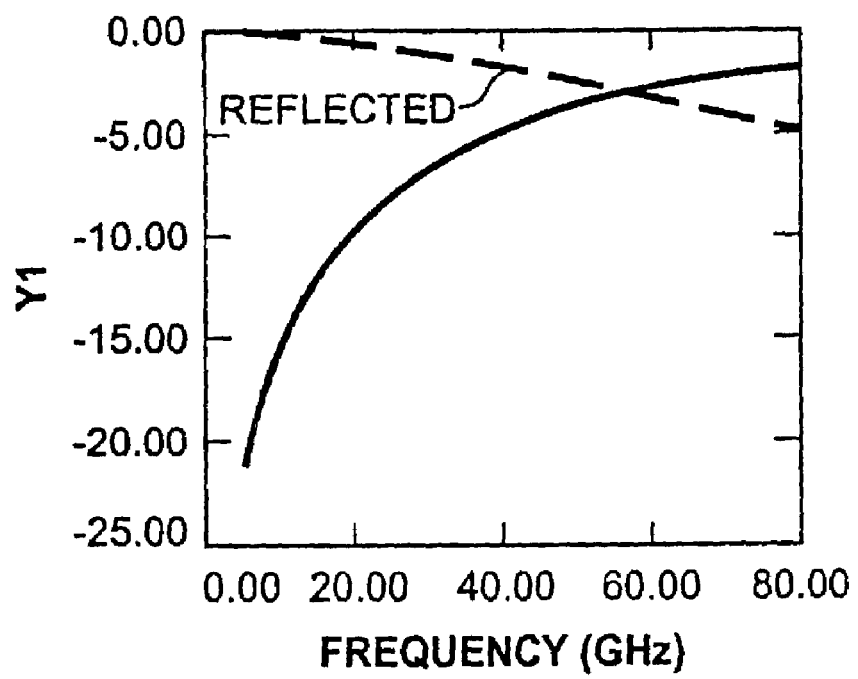

A similar situation occurs with the "off" state as shown in FIGS. 10A and 10B. FIG. 10A shows a simplified schematic of the diode-based modulator of FIG. 9A, but in the switch-closed or so-call "off" state. FIG. 10B shows the corresponding simulated transmission and reflection signals for this simulated diode in a forward-biased, switch-closed state. If one looks only at the low frequency performance, the transmission is very low as in FIG. 8B, and the reflection is very high also as in FIG. 8B. Unfortunately, when one looks at the higher frequencies, the performance of this diode switch degrades rapidly as 60 GHz is approached. At this frequency, the amount of transmission become comparable with the amount of reflection and hence the notion of a good "off" state also becomes seriously compromised.

High Performance Modulator of the Instant Invention

Figure 11A:
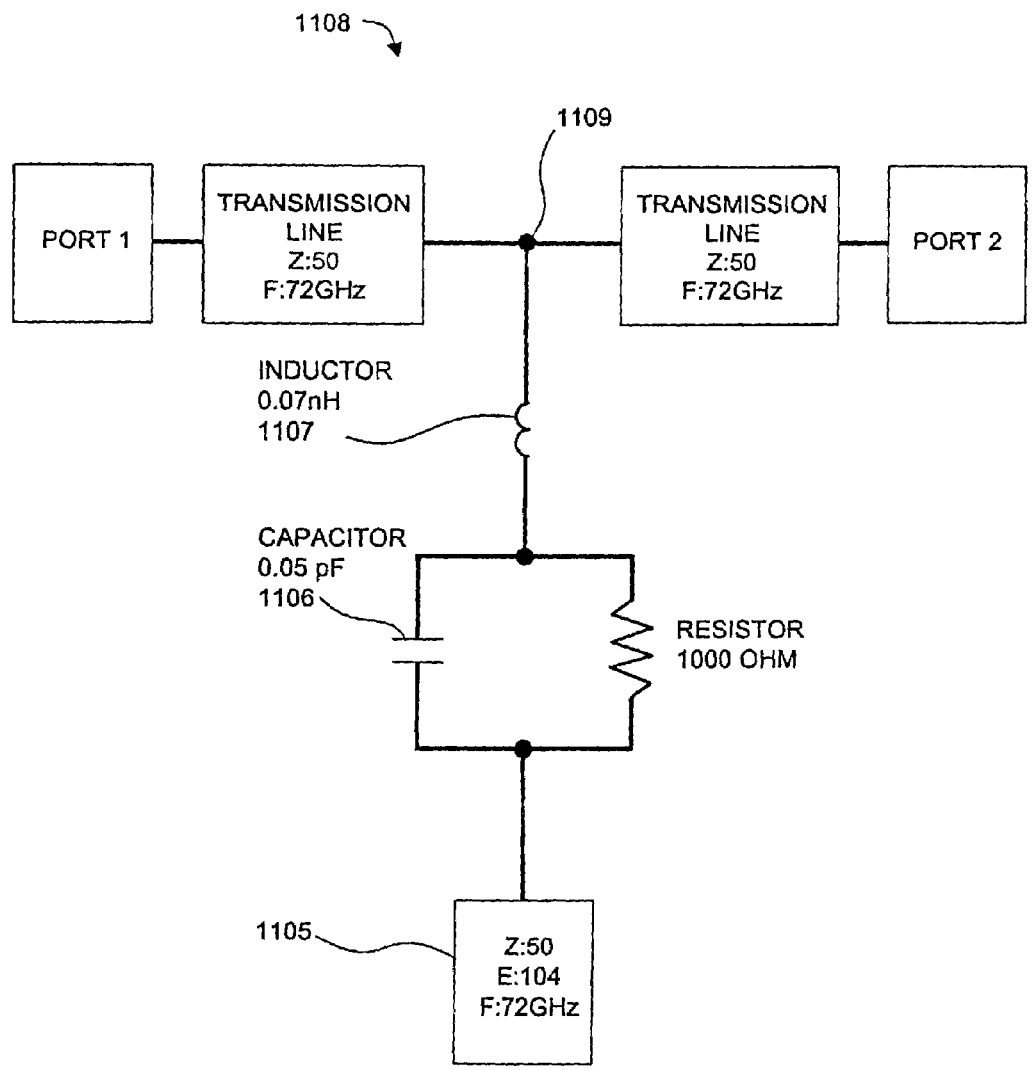
FIGS. 11A and 11B and 12A and 12B show a preferred embodiment of the present invention comprising a tuning stub to produce a resonant LC circuit to provide a high frequency RF modulation in which a diode is back-biased for "off" (i.e., no transmit) and forward-biased for "on" (or transmit).
Figure 11B:
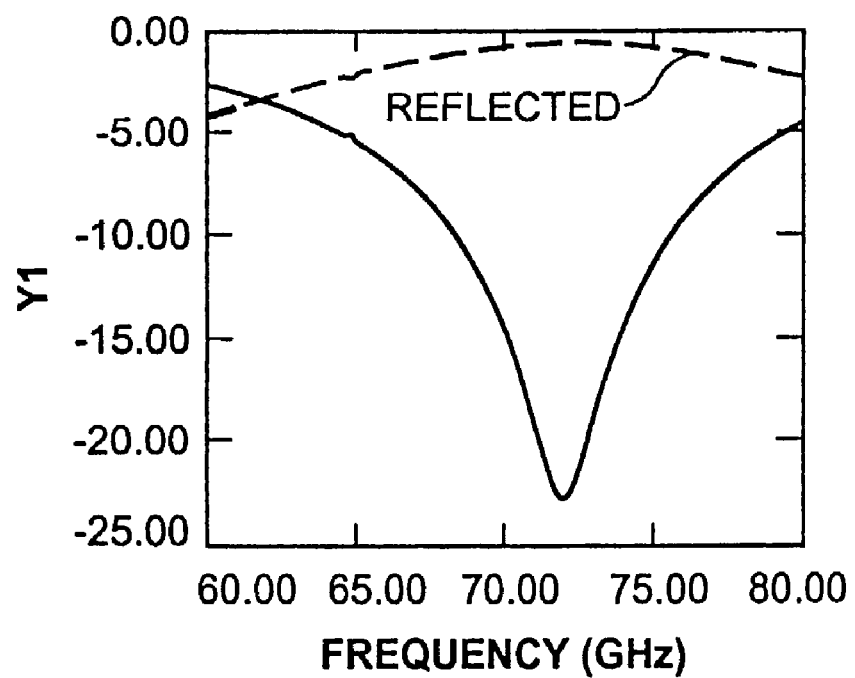

The modulator of this invention is capable of high data rate modulation of high frequency signals. This greatly improved performance is the result of the addition of a tuning stub to diode MA4E2038 as shown in FIG. 11A. The modified diode-based modulator can operate at in the range of 72 GHz. FIG. 11B shows the simulated transmission and reflection signals for this simulated diode in a back-biased, switch-open state. In the frequency range of about 72 GHz, the reflection is very high, and the transmission is very low. The reader should note that the switching convention used for this embodiment is opposite that of the conventional modulator. This is because in the "diode-off" state, the tuning stub 1105, diode capacitance 1106 and lead inductance 1107 all combine to form a resonant LC circuit which, when properly tuned, presents an RF short across the transmission line at the point 1109 at or near 72 GHz.

Figure 12A:
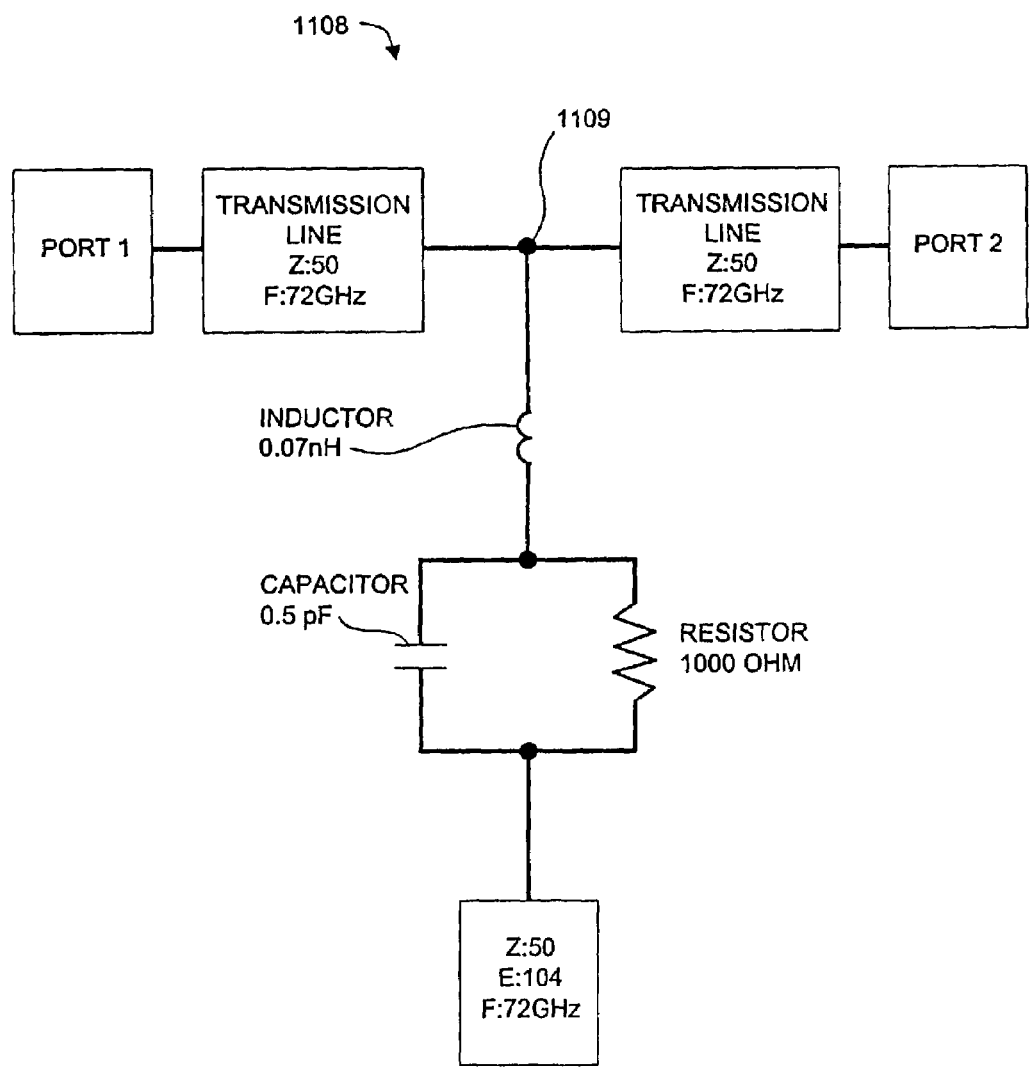

FIG. 12A shows the same circuit as FIG. 11A except now in the forward-biased diode state. In this case, at or near 72

Figure 12B:
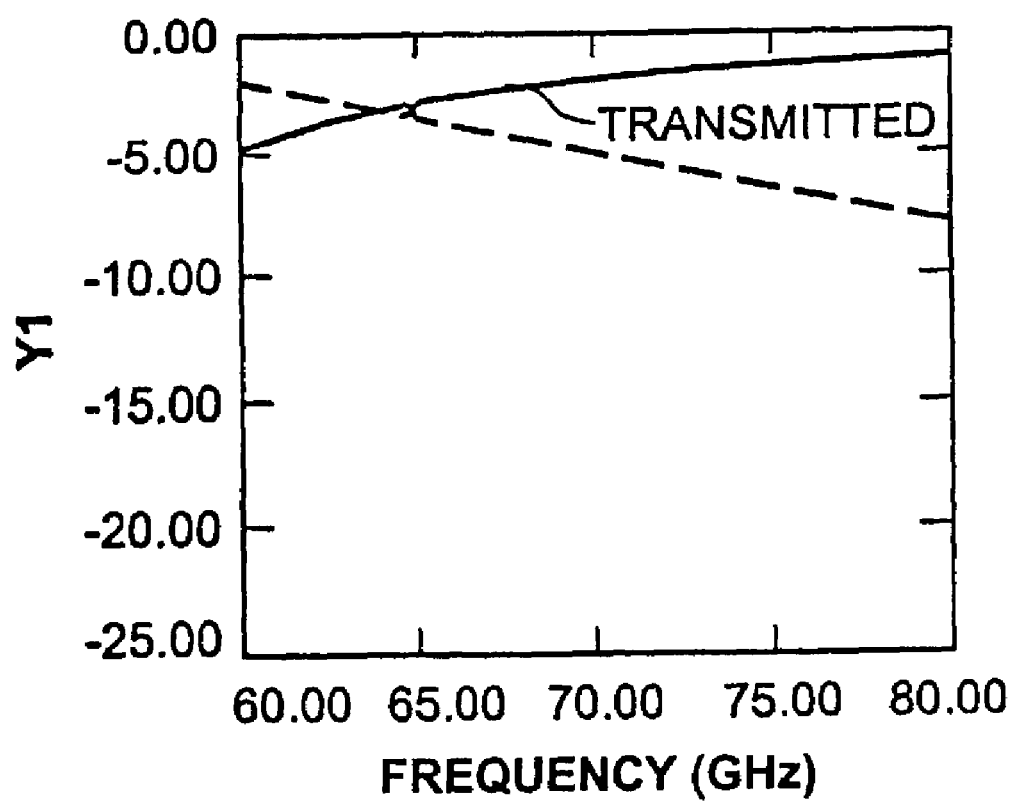

GHz, the transmitted signal becomes large while the reflected signal becomes relatively small as shown in FIG. 12B. Again, this is consistent with a modulator that works with an "on-off" relationship, which is opposite that of the conventional diode modulator with regards to the bias condition of the diode. In the state shown in FIG. 12A, the tuned circuit has been thrown "out of tune" (as far as 72 GHz transmission is concerned) by the application of a forward bias to the diode.

Worthy of special note is the fact that the model of FIGS. 12A and 12B assumes no conductive contribution to the diode "switching" or modulation of the RF signal in the transmission line. In this case, it is assumed that the capacitance of the diode has changed (increased by a factor of 10) as a result of a slight forward bias on the diode (from the modulator signal). The fact that diodes display a large increase in junction capacitance when slightly forward-biased is well known (see, for example, page 287 of *RF Circuit Design, Theory and Applications*, by R. Ludwig and R. Bretchko, Prentice Hall ®2000). Thus, the instant invention can modulate an RF signal by changes induced in a diodes capacitance rather than by changes induced in a diodes conductance.

An implication of this novel mode of modulation is that a potentially power consumptive situation in the switching diode can be avoided. With a conventional modulator that uses conductive switching, a large amount of power is resistively dissipated when the resistance of the diode crosses through the value corresponding to the characteristic impedance of the transmission line. For example, when a diode becomes forward biased to a resistance of 50 ohms when used to modulate a 50-ohm transmission line maximum power transfer to (and dissipation occurs in) the diode junction resistance. During this "matched" condition half the power can be dissipated. Thus, during a conductive transition there is a time when the switching process is very inefficient. By contrast, the modulator of the present invention need not drive the diode through such a lossy transition. Hence the inefficient process that occurs during conventional conductance switching is avoided altogether.

Need for Adaptive Power Transmitter Control

Millimeter wave point-to-point open-space communication links can be confined within less than one degree. The communication range is also limited. Therefore, the same spectral range can be used over and over again, providing almost unlimited communication channels at very high data rates. However, as these point-to-point wireless communication links proliferate, the need to prevent interference between nearby links increases, especially when these links are operating on the same or overlapping frequencies. Although millimeter-wave communication links are normally designed for narrow beams, there exists the possibility that two closely located links may interfere with each other, or that energy reflected from structures, terrain, or other objects may bounce into and along the path of another communication link, causing interference. FIG. 13A illustrates a group of point-to-point communications links that are operating in a non-interfering basis. FIG. 13B illustrates the same link but an obstruction 40, such as a building or a tree, produces some reflection of some of the transmitted signal resulting in the potential for one of the signals to interfere with one or more of the others. To minimize the potential interference between multiple links, it is desirable to operate the transmitter(s) in each link at the minimum necessary power level required to achieve reliable communications. The minimum transmitted power level for each link varies, depending on the link distance, weather conditions, terrain, atmosphere, and other factors. Some of these factors such as the weather fluctuate as a function of time. The present invention provides adaptive transmitter power control to maintain the minimum necessary transmit power under changing conditions. As weather and atmospheric conditions vary, the link path attenuation varies, causing the received signal to vary considerably. However, transmitted power is monitored and adjusted to maintain the signal level at the receiver within a desired range.

First Preferred Embodiment

Figure 14:
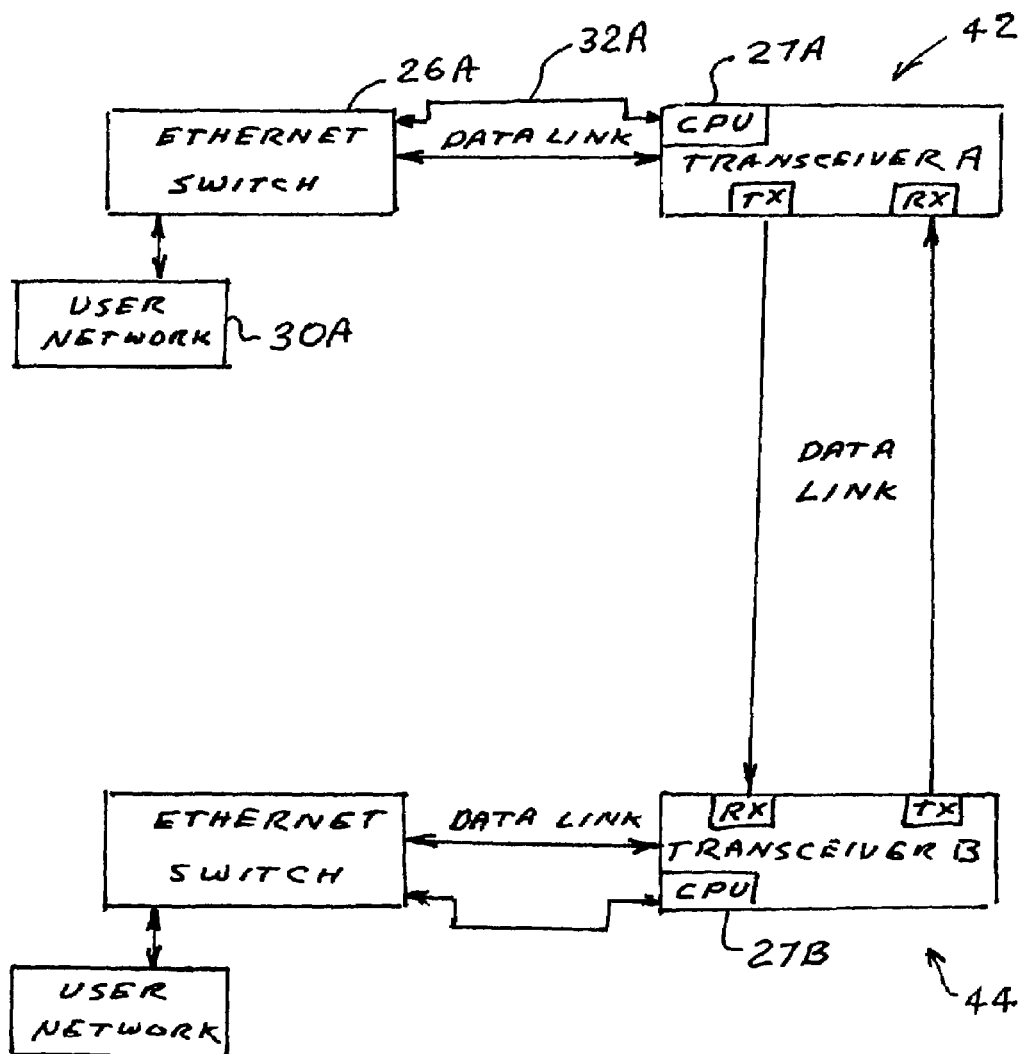
FIG. 14 shows the block diagram of a data link in which an Ethernet switch is used at each end of the link to combine and extract radio CPU data with other external user data.
Figure 15:
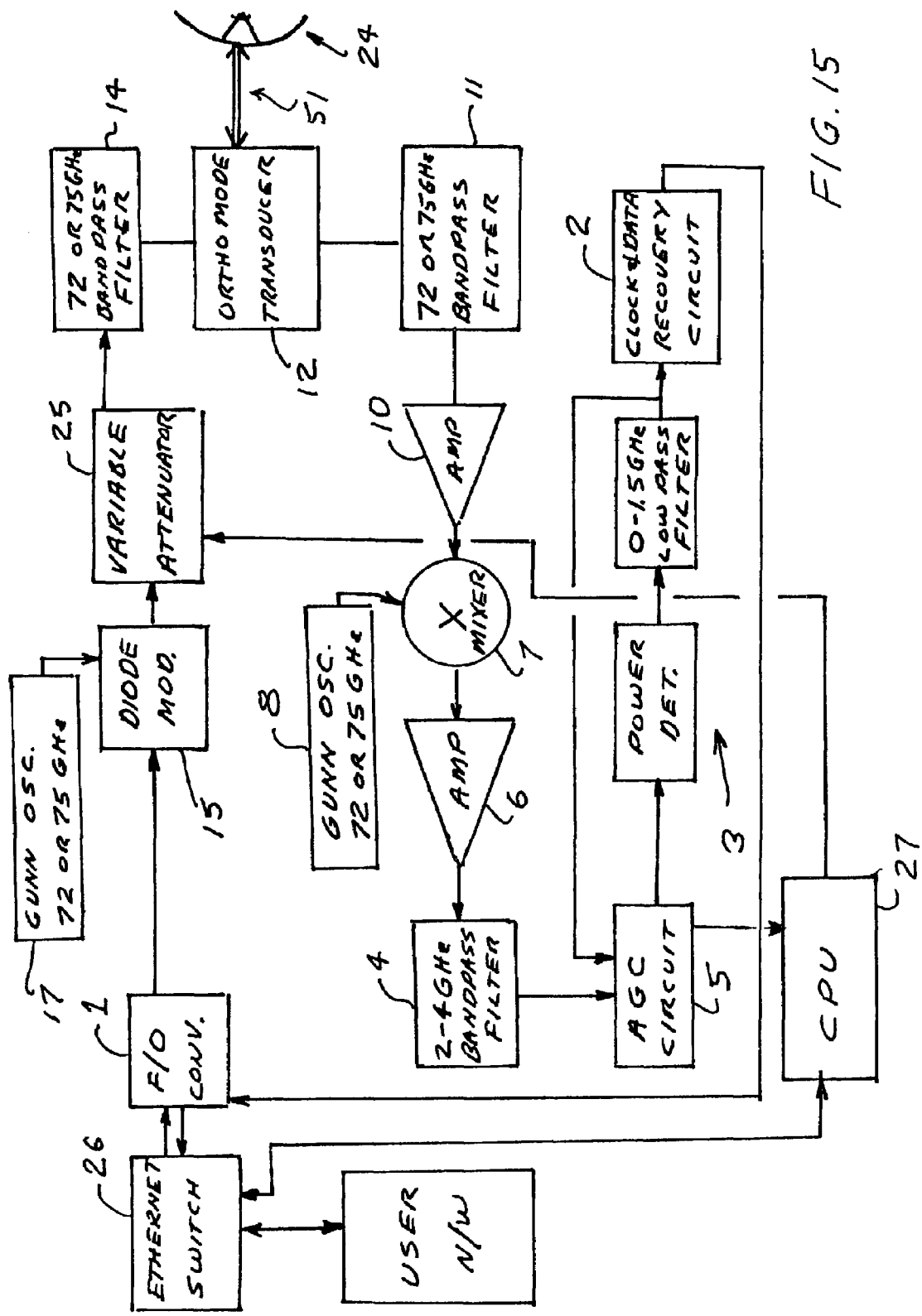
FIG. 15 shows a block diagram of a radio in which an Ethernet switch is used to combine and extract data from the data stream being passed over the link.
Figure 16:
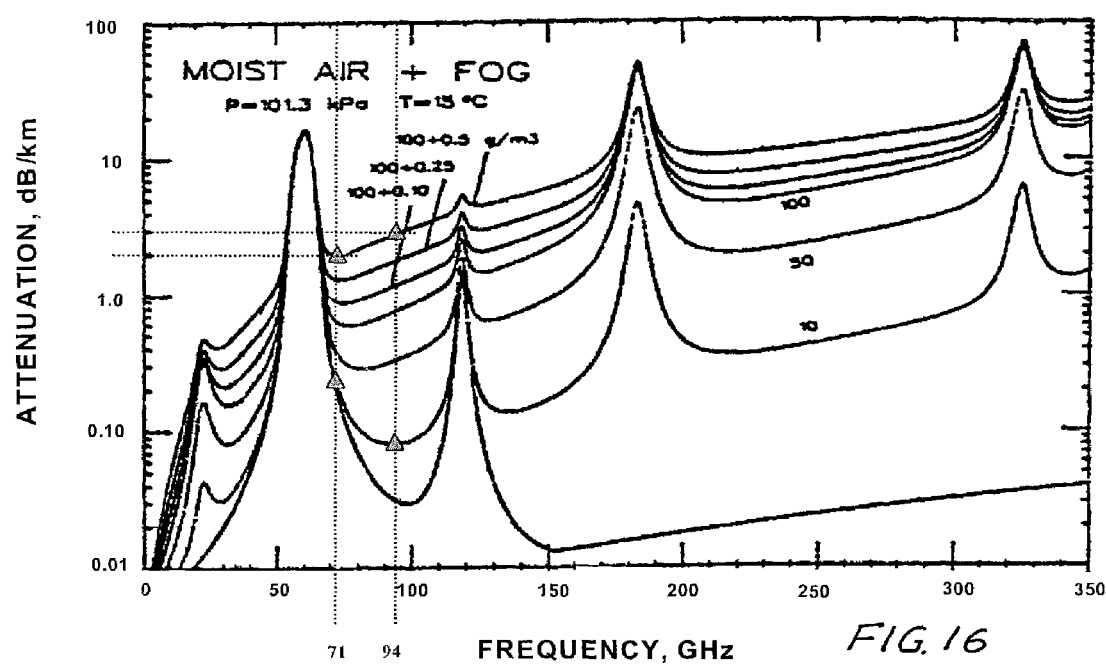
FIG. 16 shows atmospheric attenuation as a function of frequency for millimeter-wave frequencies, at various levels of relative humidity.

In a first preferred embodiment built and tested by Applicants, a millimeter-wave data link is configured to pass Ethernet data packets bi-directionally between the ends of the link. A block diagram of the data link is shown in FIG. 14. A block diagram of the millimeter-wave transceiver used at each end of the link is illustrated in FIG. 15. One end of the link 42 (designated as "Transceiver A") transmits at 72 GHz and receives at 75 GHz, and the other end 44 (designated as "Transceiver B") transmits at 75 GHz and receives at 72 GHz. Dish antennas 24 with a diameter of 2 feet and feedhorns 51 are used at each end to achieve a radiated beam width of approximately 0.34 degrees.

The received signal strength at end A is used to control the power transmitted by link end B. The received signal strength at link end B is used to control the power transmitted by link end A. The signal strength received at A is communicated to end B via the data stream flowing from A to B. The signal strength received at B is communicated to end A via the data stream flowing from B to A. The received signal strength is used to adjust the transmitted power in such a way as to keep the received signal strength within a desired range over changing conditions in the path between link ends A and B.

The received signal strength at link end A is sensed by the Central Processing Unit (CPU) 27A via the Automatic Gain Control (AGC) circuitry 5 (see FIG. 15). The CPU 27 encodes this data into message packets that are sent via an Ethernet connection as shown at 32A to an Ethernet switch 26A, which combines the CPU message packets with other Ethernet message traffic flowing from user network 30A into the radio for transmission to link end B. The CPU message flows across the data link from A to B and into an Ethernet switch 26B at link end B, which routes the CPU message (from link end A) to the CPU 27B at link end B. The CPU at link end B interprets the Ethernet message packets and extracts the signal strength received at A. The CPU 27B at link end B compares the signal strength received at A to a predetermined range, and if the received signal strength is lower than a low threshold of the predetermined range, CPU B increases the transmitted power level at link end B. If the signal strength received at link end A is determined to be above an upper threshold of the predetermined range, CPU B decreases the transmitted power level at link end B. The increase or decrease in transmitted power level at link end B is accomplished by the CPU via a variable attenuator 25 (digitally controlled) in the transmit signal path. The power level transmitted by link end A is adjusted in a similar fashion using the signal strength measured at link end B and passed to link end A over the data link. The reader should note that FIG. 15 represents both ends of the link since they are identical except for local oscillator frequency, and the A's and B's in FIG. 15 have been dropped in the references to the components. The transceivers are described in detail below.

Transceivers

The link hardware consists of a millimeter-wave transceiver pair, including a pair of mmw antennas 24 and a pair of Ethernet switches 26 (one for each transceiver). The mmw signal is amplitude modulated and single-sideband filtered, and includes a reduced-level carrier. The tuner receiver includes a heterodyne mixer, phase-locked intermediate frequency (IF), and IF power detector. Transceiver A (FIG. 14) transmits at 71–73 GHz, and transceiver B (FIG. 14) transmits at 74–76 GHz. Transceiver A receives at 74–76 GHz and transceiver B receives at 71–73 GHz.

The transceiver at link end A is comprised of dish antenna 24, manufactured by Milliflect Corporation, the radio electronics are manufactured by the inventors, CPU 27 manufactured by Diamond Systems Corporation, and an external Ethernet switch 26 manufactured by Hewlett Packard Corporation. Signals received by antenna 24 pass through the Ortho-mode Transducer 12 and a 71–73 GHz bandpass filter 11, and are amplified by low-noise amplifier 10. After being amplified the signal is mixed with the 75 GHz Local Oscillator 8 signal by mixer 7 to result in a 2–4 GHz down-converted signal. This resulting 2–4 GHz signal is amplified by amplifier 6 made by Hittite Corporation and bandpass filtered 4, before being sent to the automatic gain control (AGC) circuit 5. After passing through the AGC circuit, the signal is power detected and lowpass filtered by detector circuit 3, to result in a baseband data signal. The baseband data signal is passed to clock and data recovery circuit 2 (using an Analog Devices ADN2809 clock recovery chip), which cleans up the data waveform shape before it is converted to an optical signal by the fiber-optic interface 1, manufactured by Finisar, Incorporated.

Data incoming from the user network is acquired by the Ethernet switch 26, where it is combined with other Ethernet data, from the transceiver CPU 27 and from other user networks. The combined data stream from the Ethernet switch is sent to the Fiber-optic converter 1 and used to modulate the output of the 75 GHz Gunn oscillator 17 by diode modulator 15. The modulated signal is passed through the variable attenuator 25 and is then bandpass filtered 14 and sent to the Ortho-mode transducer 12 that routes the signal to the antenna 24.

The AGC circuit 5 senses the strength of the received signal and adjusts its level to present a fixed level to the detector circuit 3. The AGC circuit 5 also sends the sensed signal level to the CPU 27, which sends the level via the Ethernet switch 26 to the other end of the link. At the other end of the link, the Ethernet switch 26 routes the signal strength information to the CPU 27 which uses the signal strength information to command variable attenuator 25, adjusting the transmitted signal power.

Commercial Unit

A millimeter wave communication link ready for commercial application has been built and tested by Applicants. That link is described in detail below by reference to FIGS. 17 through 27B. This embodiment includes wireless point-to-point data communications link transceivers capable of supporting 155, 622, 1244, 2488, and 1250 Mbps data rates over distances of 0.1 to more than 10 miles. The data rates specified are commonly known as OC-4, OC-12, OC-24, OC-48, and Gigabit Ethernet. A complete point-to-point data link would employ one of the described transceivers at each end of the data link. In a preferred embodiment, a transceiver at one end of the data link transmits in the 74–76 GHz frequency range and receives in the 71–73 GHz range. The transceiver at the other end of the data link transmits in the 71–73 GHz frequency range and receives at 74–76 GHz. Transceiver operations at each end of each link are identical except for the choice of frequencies. In a preferred embodiments, the transceiver electronics enclosure is mounted directly to a 2-foot diameter dish antenna. The use of 2-foot antennas allows link distances of up to 5 miles to be achieved in fair weather, with a bit error rate (BER) of less than $10^{-12}$, or distances of up to 1 mile to be achieved with rainfall rates of up 1.5" per hour. The implementation of the transceiver electronics and of the weather-resistant outdoor enclosure is disclosed.

GPS Positioning

In a preferred embodiment, the transceiver at each end of the data link incorporates a GPS receiver and CPU that receives signals from GPS satellites, computes the transceiver position, and either on command, or periodically, and reports this position to a remote location. The data link communications electronics and GPS receiver are housed in a common enclosure. Data link communications take place using millimeter-wave frequencies and a two-foot diameter dish antenna. GPS satellite signals are received via a small active antenna mounted on the outside or incorporated as part of the electronics enclosure.

The transceiver uses a fiber-optic interface to connect to a user network, and transmits data wirelessly in the 74–76 GHz frequency band to another embodiment of the invention. The transceiver receives data from the other transceiver in the 71–73 GHz frequency band, and sends this data to the user network via the fiber-optic interface. The transceiver of this invention is composed of millimeter-wave electronics, Intermediate Frequency (IF) electronics, input/output electronics, and an outdoor-suited enclosure. The transceiver also contains a power supply and a Central Processing Unit (CPU) for status and health monitoring and radio control, and is connected directly to a Cassegrain-type dish antenna. Information is sent over the millimeter-wave link using simple on-off keying (amplitude modulation).

In operation, the preferred embodiment of the invention uses GPS receivers to automatically determine the position of the data link endpoints, and reports these positions to a Link Operations Center. Furthermore, when initially deployed to the field, the invention first listens for other signals in the band of operation, that would potentially be interfered with should the link transmitter be activated. In the event that other signals are found to already be present in the band, the link will notify the operator, and require some override command before transmitting any signals of its own. This protocol of operation reduces the chances of newly deployed data links interfering with pre-existing data links.

| Features of the Preferred Embodiment | |
| --- | --- |
| Receive Frequency Range | 71–73 GHz |
| Transmit Frequency Range | 74–76 GHz |
| Transmitter Output Power | 40 mw (+16 dBm) |
| Data Rates (user selectable) | 155, 622, 1244, or 1250 Mbps |

-continued

Features of the Preferred Embodiment

| | |
|---|---|
| Connection to User Network | Fiber-optic connection, type LC |
| Connection to User Power | 110 VAC |
| Power Consumption | <50 watts |
| Weight (without antenna) | 23 lbs. |
| Height (without antenna) | 13" |
| Width (without antenna) | 13" |
| Depth (without antenna or feedhorn) | 10" |
| Depth (without antenna) | 14" |
| User CPU interface | 10baseT Ethernet - web browser interface or RS232 serial link |

A Global Positioning System (GPS) receiver is attached to the CPU, and the GPS receiver converts the GPS satellite signals to physical position coordinates. The CPU reads these coordinates from the GPS receiver and reports them via the data link to a remote location (Link or Network Operations Center). The CPU board is built with an industry-standard PC/104 form-factor, allowing the GPS receiver to easily be plugged onto the 'stack'. The GPS receiver of the preferred embodiment is model #GPS140HR, with active antenna, manufactured by Real Time Devices USA, Incorporated, State College, Pa.

Transceiver Description

Figure 20A:
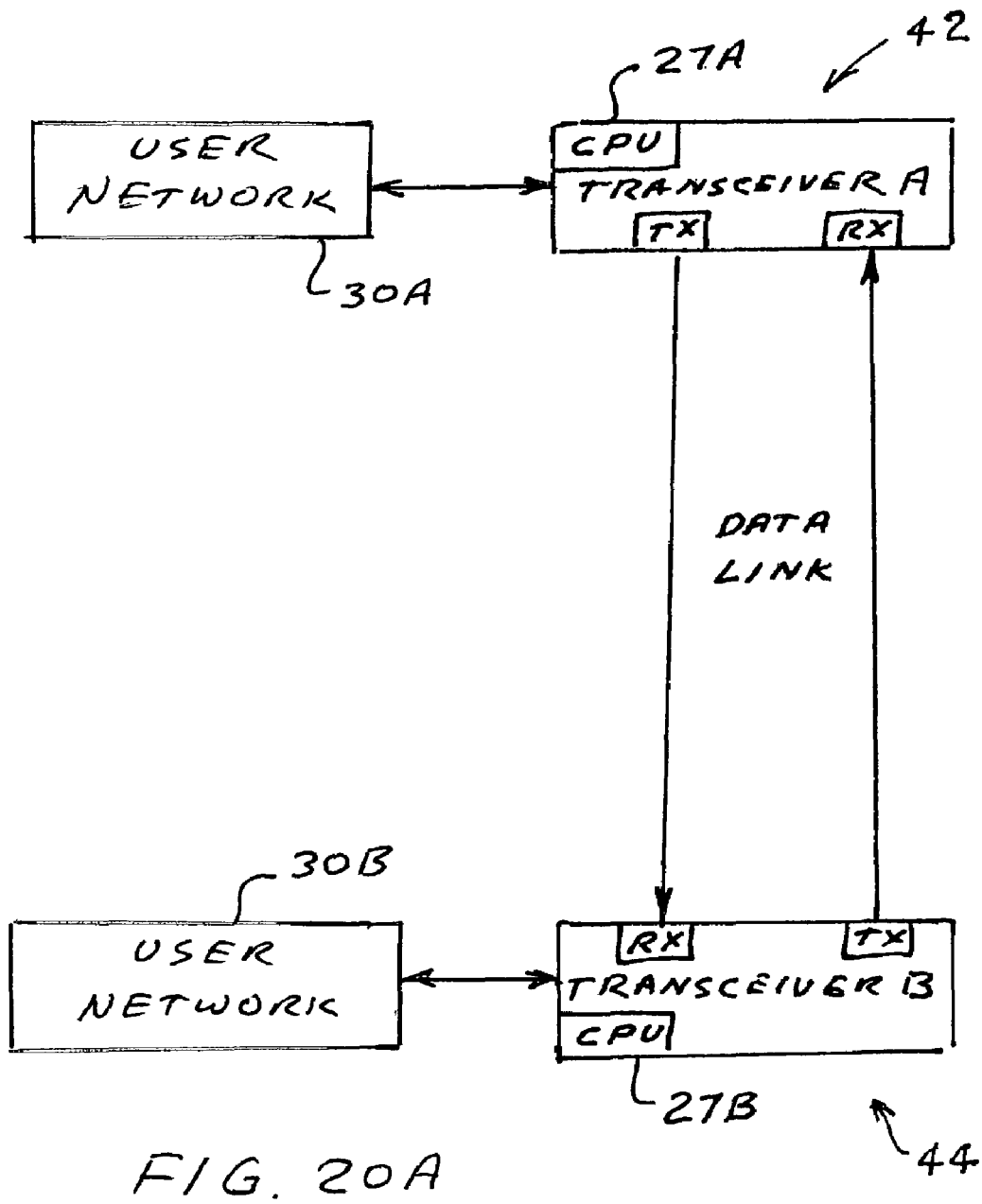
FIGS. 20, 20A, and 20R shows a block diagram of a millimeter-wave communications transceiver.
Figure 20B:
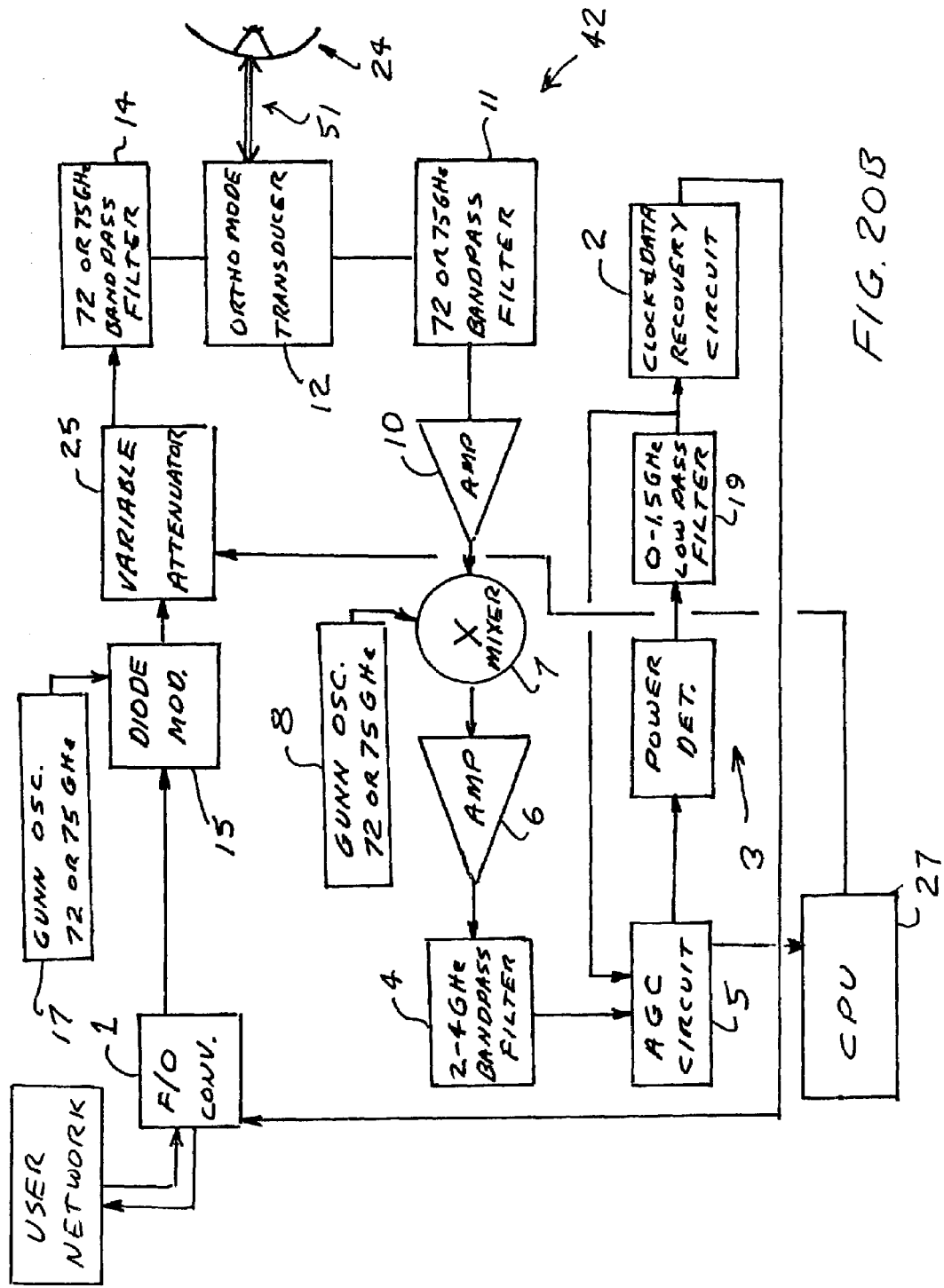

The description of transceiver electronics is done by reference to FIGS. 20A and 20B. FIG. 20A shows user networks 30A and 30B. Transceiver A 42 connected to user network 30A includes central processor unit (CPU) 27A and transceiver B 44 connected to user network 30B includes CPU 27B. The transceiver 42 as shown in FIG. 20B is comprised of dish antenna 24, manufactured by Milliflect Corporation, radio electronics enclosure (not shown) manufactured by Harmony Castings, millimeter-wave transmitter, millimeter-wave receiver, IF electronics, central processing unit (CPU) 27, and I/O electronics. Signals received by antenna 24 pass through feedhorn 51 and into the Ortho-mode Transducer 12 and a 71–73 GHz bandpass filter 11, and are amplified by low-noise amplifier 10. After being amplified the signal is filtered by second bandpass filter 11, and mixed with the 75 GHz Local Oscillator 8 signal by mixer 7 to result in a 2–4 GHz down-converted signal that is amplified by amplifier 6 and filtered by filter 4. This resulting 2–4 GHz signal is sent to automatic gain control (AGC) circuit 5. After passing through the AGC circuit, the signal is power detected and lowpass filtered by detector circuit 3, to result in a baseband data signal. The baseband data signal is then passed to clock and data recovery circuit 2 (using an Analog Devices ADN2819 clock recovery chip), which in turn cleans up the data waveform shape before it is converted to an optical signal by the fiber-optic interface 1.

Data incoming from the user network is sent to the Fiber-optic converter 1 and used to modulate the output of 75 GHz Gunn oscillator 17 by diode modulator 15. The modulated signal is passed through bandpass filtered 14 and sent to the Ortho-mode transducer 12 that routes the signal to the antenna 24 via feedhorn 51.

Detailed Description of Key Components of the Invention

Several of the key components of the invention have been fabricated by Applicants. A detailed description of these components is made with reference to FIGS. 17 through 27B. These components may be manufactured using techniques standard to the industry.

Power Supply

The power supply is connected to standard 110 VAC and supplies +12V, +5V, -12V for the various radio components via I/O Board 70 and Signal Conditioning & Clock Recovery Board 71. Power Supply 61 is model #ACE890, purchased from ICP America, Pomona Calif., or equivalent (See FIG. 17).

I/O Circuit Board

Connection to the user network, AC power main, and external world is made via I/O Circuit Board 70, shown in FIGS. 18A and 18B. I/O circuit board 70 is mounted to inner cover 53. The I/O Circuit board contains Fiber-Optic Interface 1, connections to Power Supply 61, an Ethernet Connection 71 from CPU 27 to the external environment, a USB connection from CPU 27 to the outside environment, and RS232 Serial Link connections from CPU 27 to the outside environment. The PC board is manufactured by Proto-Qwik, Incorporated, San Diego, Calif., or an equivalent PC board fabrication vendor and is assembled in-house.

Fiber-Optic Interface

Fiber optics interface 1 as shown in FIG. 15 converts optical signals to and from the user network to electrical signals used by the radio. The device supports data rates up to 1.25 Gbps and is part #FTRJ-8519-1, is manufactured by Finisar, Incorporated, Sunnyvale, Calif., or equivalent. Fiber-Optic Interface 1 is located on I/O circuit board 70 as shown in FIGS. 18A and 18B.

Signal Conditioning & Clock Recovery Board

Figure 17:
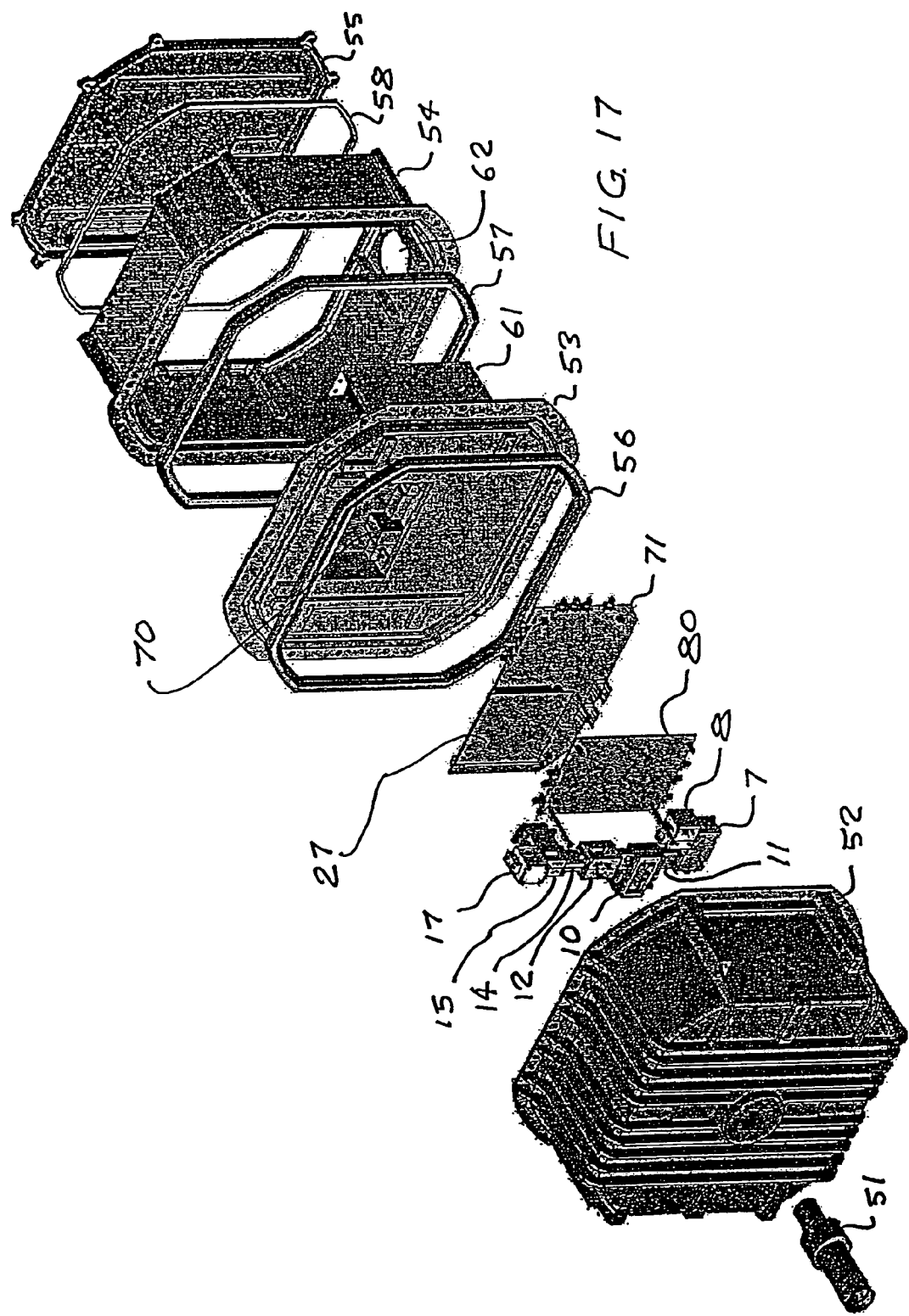
FIG. 17 shows the components of the millimeter-wave transceiver.

Signal Conditioning & Clock Recovery Board 71 is shown in FIG. 17 and FIGS. 19A and 19B. The board is mounted to inner cover 53 and supports CPU 27. Power is supplied to CPU 27 and other radio electronics from Power supply 61, via I/O board 70, and through Signal Conditioning & Clock Recovery board 71. The PC board is manufactured by Proto-Qwik, Incorporated, San Diego, Calif., or an equivalent PC board fabrication vendor and is assembled in-house. Signal Conditioning & Clock Recovery Board 71 contains circuitry that performs the following functions:

Converts the +12V supplied by Power Supply 61 to +10V OV for Gunn Oscillators 8 and 17 shown in FIGS. 20 and 20B.

Re-clocks and restores digital data received by the radio via Power Detector circuit 3 (using Clock and Data Recovery circuit part #ADN2819, manufactured by Analog Devices, Norwood, Mass.). The basic circuit design is also provided by Analog Devices and is incorporated into the design of Signal Conditioning & Clock Recovery Board 71.

Generates and Detects a $2^7$ Pseudo Random Bit Stream (PRBS7), using PRBS Generator, part #TLK1501 (not shown), manufactured by Texas Instruments, Corporation, Dallas, Tex. The basic circuit design is also provided by Texas Instruments and is incorporated into the design of Signal Conditioning & Clock Recovery Board 71.

Switches and selects the data stream presented to Diode Modulator 15 (shown in FIG. 20B), between incoming Fiber-Optic Converter 1, PRBS Generator 74, and Clock & Data Recovery Circuit 73. The data stream is selected by a Crossbar Switch Circuit, part #TQ8004, manufactured by Triquint Semiconductor, Hillsboro, Oreg.

Generates clock signals using Oscillator Circuit, that allow Clock & Data Recovery Circuit and PRBS Generator to operate at data rates of 155, 622, 1244, and 1250 Mbps.

Senses the level of the received signal via AGC Circuit 5 on IF Circuit Board 80 and presents this level to CPU board 27.

Senses the level of the transmitted signal via Diode Modulator 15 and presents this level to CPU board 27.

CPU Board

The Central Processing Unit (CPU board 27) performs status monitoring, reporting, and control of various radio parameters and functions. CPU 27 is model "Prometheus", manufactured by Diamond Systems Corporation, Newark, Calif. CPU 27 is "PC/104" form factor compatible and runs a modified version of the LINUX operating system from flash memory. CPU 27 communicates with the outside environment via a 10baseT Ethernet connection and two RS232 serial links (passed through I/O board 70). Software is configured to allow updates from remote locations via the Ethernet or serial connections. CPU board 27 contains 16 analog and 24 digital I/O signals, which are connected to the radio electronics via Signal Conditioning & Clock Recovery Board 71. The analog I/O signals on CPU 27 are used to monitor +12V, −12V, +5V, +3.3V, and the current flowing in each of these supplies, via Signal Conditioning & Clock Recovery Board 71. The analog I/O on CPU 27 is also used to sense the AGC level (received signal strength) and TX power (transmitted power level) of the radio via Signal Conditioning & Clock Recovery Board 71. Digital output signals from CPU 27 are used to configure the data path Crossbar Switch, manufactured by Triquint Semiconductor, Beaverton, Oreg., and to set the clock frequency used for the data path via Oscillator Circuit 75. The PC board is manufactured by Proto Qwik, Incorporated, San Diego, Calif., or an equivalent PC board fabrication vendor and assembled in-house.

IF Circuit Board

IF Circuit Board 80 receives a 2–4 GHz intermediate frequency (IF) signal from Mixer 7 and outputs a detected digital data stream to Clock & Data Recovery circuit 73. IF Board 80 is shown in FIG. 17 and FIGS. 21A and 21B. IF board 80 contains circuitry which performs the following functions:

- Amplifies the output of Mixer 7 by approximately 30 dB and passes the amplified signal to Variable Attenuator 79, part #HMC 346MS8G, manufactured by Hittite Microwave Corporation, Chelmsford, Mass.
- Amplifies and Bandpass filters with filter 77 the output of Variable Attenuator 79 restrict the frequency band to 2–4 GHz and presents this filtered signal to Detector Circuit 78. Variable Attenuator 79 has a range of approximately 30 dB, allowing for a wide fluctuation in received signal level.
- Senses the signal level detected by Detector Circuit 78 and adjusts Variable Attenuator 79 to maintain a constant preset signal level at the output of Detector Circuit 78, manufactured by Mini-Circuits, Incorporated, Brooklyn, N.Y. The sensed signal level is also passed to CPU 27 via Signal Conditioning & Clock Recovery Board 71.
- Detects the power in the signal using Detector Circuit 78, part #ADE-30W, manufactured by Mini-Circuits, Incorporated, Brooklyn, N.Y.

Feedhorn

Figure 22A:
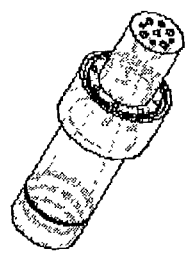
FIGS. 22A, 22B and 22C show details of feedhorn 51.
Figure 22B:
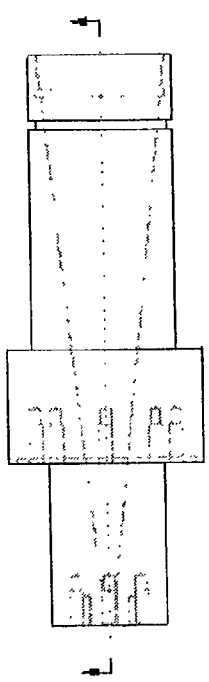
Figure 22C:
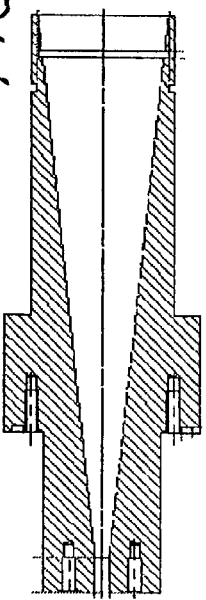

Feedhorn 51 converts the signal recieved by Cassegrain antenna 24 to a circular waveguide connected to Ortho-Mode Transduced 12. A detailed drawing of Feedhorn 51 is shown in FIGS. 22A, 22B and 22C Feedhorn 51 is mounted to Front Housing 52 by several screws and is sealed at the end with a plastic disk (not shown) to prevent water from entering the waveguide and Ortho-Mode Transducer 12. An O-ring (not shown) between feedhorn 51 and Front Housing 51 prevents the entry of water at this interface. Feedhorn 51 may be manufactured by Sisson Engineering, Northfield, Mass., or an equivalent machine shop Ortho-Mode Transducer Ortho-Mode Transducer (OMT) 12 is attached to Feedhorn 51 and Bandpass Filters 11 and 14. OMT 12 is used to guide signals with horizontal polarization form antenna 24 via feedhorn 51 to bandpass filter 11, and route signals with vertical polarization from Diode Modulator 15 via Bandpass filter 14 to antenna 24 via feedhorn 51. OMT 12 separates signals with different polarizations into two separate paths, or combines signals with different polarization into a common path, the common path connected to antenna 24 via feedhorn 51. The use of OMT 12 allows a single antenna to be used for both transmission and reception without undo interference between transmitter and receiver. OMT 12 is manufactured by Sisson Engineering, Northfield, Mass., or an equivalent machine shop.

Bandpass Filters

Figure 23:
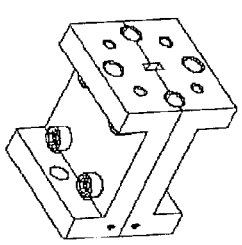
FIG. 23 shows a detail of bandpass filters 11, 14, and 19.

Bandpass filters 11 and 14 are used to provide further isolation between the transmitted signal from diode modulator 15 and the low-noise amplifier 10. A mechanical drawing of the bandpass filter housing is shown in FIG. 23. The housing is manufactured by Sisson Engineering, Northfield, Mass., or an equivalent machine shop. Inside bandpass filters 11, 14, and 19 are shims containing a grid pattern, manufactured by Advanced Metal Etching, Ligonier, Ind. The grid pattern of the shims determines the spectral range over which the bandpass filter functions. Grid patterns for bandpass filters which operate at 71–73 GHz and 74–76 GHz are selected according to criteria set by the filter fabricator. Bandpass filters 11 and 19 are configured to pass frequencies in the range of 71–73 GHz. Bandpass filter 14 is configured to pass frequencies in the range of 74–76 GHz. Bandpass filter shims of different dimensions are used inside the Bandpass filter to achieve the different passband frequencies. A detail of the filter shim dimensions are available from the supplier.

Gunn oscillator 17 generates a transmit signal at 75 GHz which is modulated with data (from fiber-optic converter 1 via the crossbar switch) by diode modulator 15 to produce a signal with a spectral range of 74–76 GHz. Bandpass filter 14 is configured to pass frequencies between 74 and 76 GHz and reject other frequencies, so that only signals in the range of 74–76 GHz may be transmitted, and unwanted emissions from Gunn oscillator 17 and modulator 15 are removed.

Signals incoming from antenna 24 via feedhorn 51 and OMT 12 are passed through Bandpass filter 11 and amplified by low-noise amplifier 10. Bandpass filter 11 is configured to pass only frequencies between 71 and 73 GHz to low-noise amplifier 10, insuring that signals from modulator 15 and bandpass filter 14 (at 74–76 GHz, for transmission) do not pass directly into the receiver. Signals from low-noise amplifier 10 are again filtered by bandpass filter 19 to remove any undesirable spectral components introduced by low-noise amplifier 10.

Diode Modulator 15

Diode Modulator 15 is used to impress a data stream onto the continuous output of Gunn oscillator 17. Diode modulator 15 turns the signal from Gunn oscillator 17 on and off, according to 1's and 0's appearing in the data stream from fiber-optic converter 1 (via the crossbar switch). This on/off keyed signal is sent through bandpass filter 14, OMT 12 and feedhorn 51 to antenna 24.

Figure 24A:
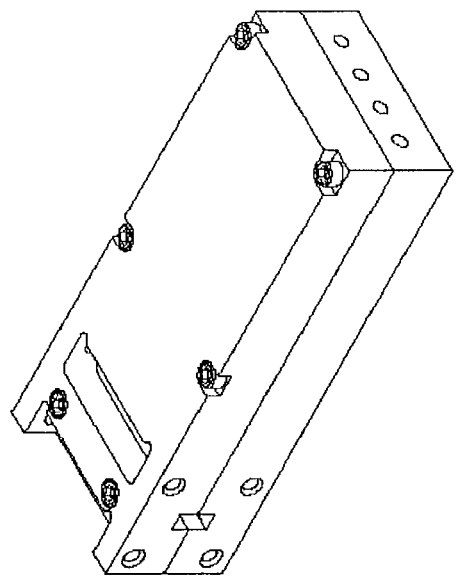
FIG. 24 shows a detail of diode modulator 15.
Figure 24B:
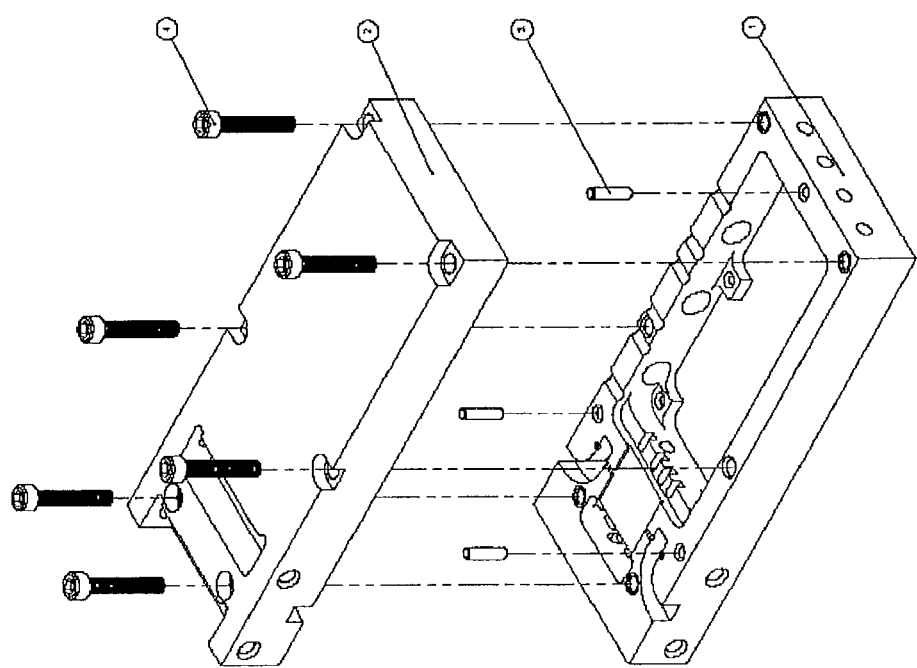
Figure 26B:
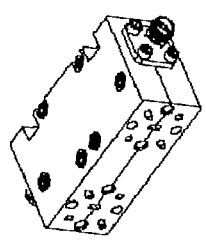
FIGS. 26A and 26B show details of mixer 7.
Figure 26A:
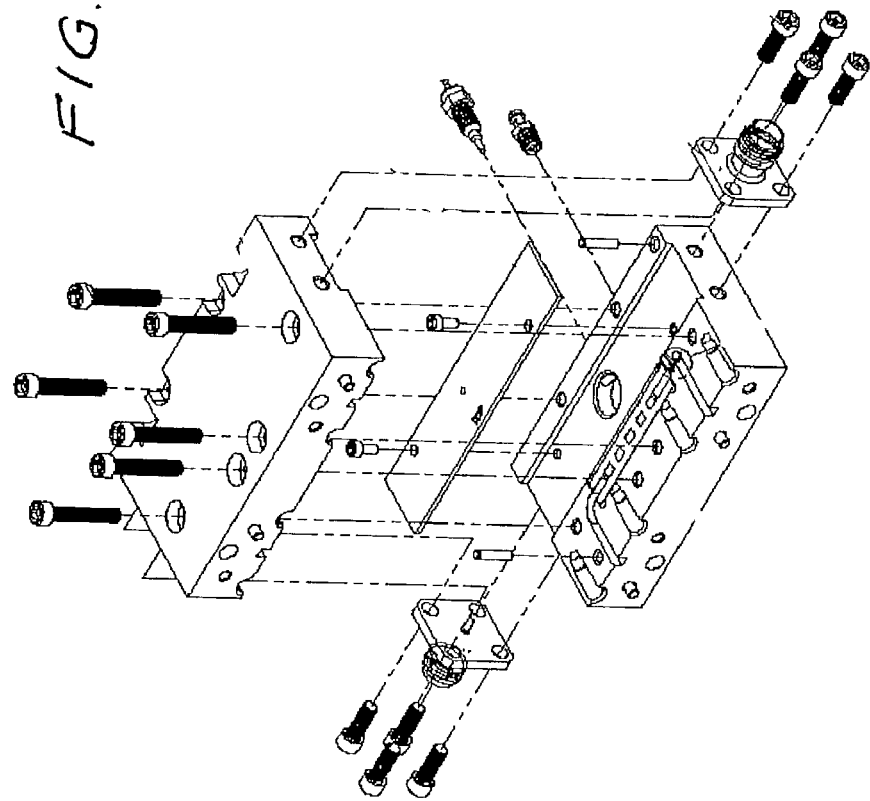

A drawing of the diode modulator is shown in FIG. 24A and 24B. The housing has been machined by Sisson Engineering, Northfield, Mass., or an equivalent machine shop. The modulator diode is part #MA4E2038, purchased from MACOM Corporation, Lowell, Mass., or equivalent. The diode is driven by a diode driver chip, part #VSC7928, manufactured by Vitesse Semiconductor, Camarillo, Calif. Modulator circuitry has been described above.

Gunn Oscillators 8 and 17

Figure 25:
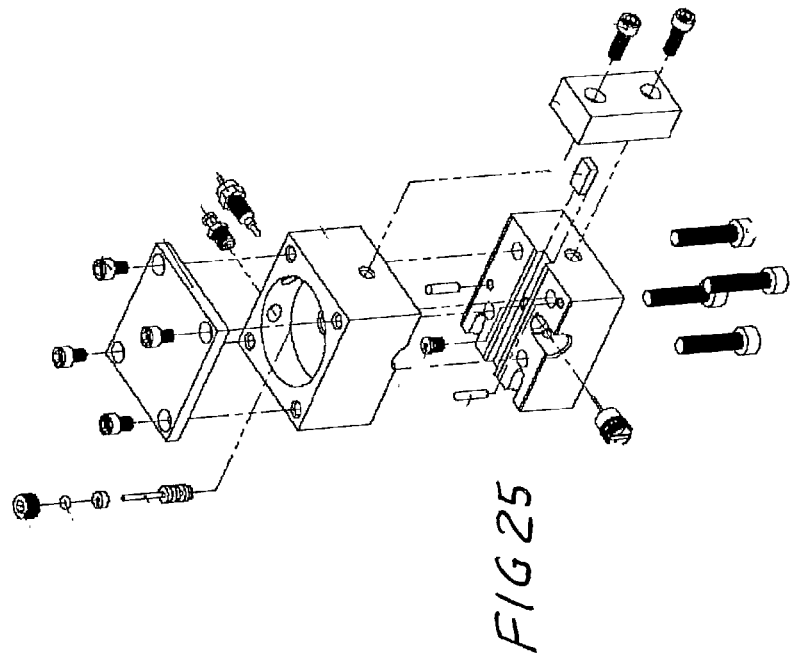
FIG. 25 shows a detail of Gunn oscillators 8 and 17.

Gunn oscillators 8 and 17 are used to generate a CW (continuous wave) signal at 75 GHz. A drawing of the Gunn oscillator housing is shown in FIG. 25. The housing is manufactured by Sisson Engineering, Northfield, Mass., or an equivalent machine shop. The diode is part #LSW9177S2, manufactured by Filtronic Solid State, Santa Clara, Calif., or equivalent. By adjusting the depth of tuning rod 91 in cavity 92, the frequency of oscillation may be tuned from 71–76 GHz.

The output of Gunn oscillator 17 forms the power source for the transmitter and is passed to diode modulator 15. Gunn oscillator 17 produces approximately 60 milliwatts of output power, which results in about 40 milliwatts of power into antenna 24 after passing through modulator 15, bandpass filter 14, OMT 12, and feedhorn 51.

The output of Gunn oscillator 8 is the local oscillator signal for the receiver and is passed to mixer 7, where it is mixed with the 72–74 GHz signal received by antenna 24, via bandpass filter 11, low-noise amplifier 10, and second bandpass filter 11.

Low-Noise Amplifier 10

Low-noise amplifier 10 serves as the first amplifier for received signals. Signals received by antenna 24 pass through feedhorn 51, OMT 12, and bandpass filter 11 into low-noise amplifier 10. The output of low-noise amplifier 10 is passed to mixer 7 through second bandpass filter 11. The low noise amplifier is designed to have a 6 dB noise figure and to amplify signals between 70 and 95 GHz. The housing for low-noise amplifier 10 is shown in FIGS. 27A and 27B, and is manufactured by Sisson Engineering, Northfield, Mass., or an equivalent machine shop.

Mixer

Signals from Gunn oscillator 8 and second bandpass filter 11 are passed to mixer 7 which mixes the incoming received signal from bandpass filter 11 with the local oscillator signal from Gunn oscillator 8 to produce a 2–4 GHz intermediate frequency (IF) signal which is sent via amplifier 6 to IF board 80. The mixer housing is shown in FIGS. 27A and 27B, and is manufactured by Sisson Engineering, Northfield, Mass., or any suitable machine shop. Mixer diodes are part #HSCH9201, made by Agilent Corporation, Palo Alto, Calif., or equivalent.

Antenna

Antenna 24 used for the transceiver is a 2' dish antenna with a Cassegrain feed configuration, comprised of dish element 94 and secondary reflector 93. Dish element 94 is part #, manufactured by Milliflect Corporation, Colorado Springs, Colo. Secondary reflector 93 is manufactured by Marathon Machine, San Diego, Calif., or a similar machine shop. Signals collected by dish element 94 are reflected onto secondary reflector 93 and then into the radio electronics via feedhorn 51. Signals from the radio electronics pass out of feedhorn 51, onto secondary reflector 93, and bounce off of dish element 94 into free space.

Enclosure

The enclosure is shown in FIG. 17 and is composed of Front Housing 52, Inner Cover 53, Rear Housing 54, Rear Cover 55, manufactured by Harmony Castings, Harmony, Pa., and Gasket Seals 56, 57, and 58, manufactured by 3D Engineering, Pompano Beach, Fla. The housings, seals, and covers form a front chamber containing the millimeter-wave and other electronic components and a rear chamber containing the Power Supply 61 and connections to I/O Board 70. Feedhorn 51 protrudes through the Front Housing and is sealed by an O-ring (not shown) to form a water-tight seal. The front chamber is water-tight, and the rear chamber is water-tight when the rear cover is in place and the conduit connection hole 62 is sealed or connected to a conduit. The two-chambered design allows factory work to be performed in the front chamber, and field/installation work to be performed in the rear chamber without exposing the front chamber electronics to any adverse environmental effects.

Single Local Oscillator per Transceiver

In the preferred embodiments described above each transceiver was provided with a local oscillator for transmission and a separate local oscillator for receiving. In other preferred embodiments each transceiver is equipped with only one local oscillator. Transceivers transmit at either 72 GHz or 75 GHz and receive respectively at 75 GHz or 72 GHz. For example, at one link, we want to transmit at 75 GHz and receive at 72 GHz. If we operate an LO at 75 GHz, we can modulate it for the transmitted signal. Incoming signals at 72 GHz are mixed with this same LO signal and produce a 3 GHz intermediate frequency (IF) signal for the IF circuitry. At the other end of the data link, we want to transmit at 72 GHz and receive at 75 GHz. The LO at this other end of the link is operated at 72 GHz and modulated for the transmitted signal. This same LO frequency is mixed with incoming RF at 75 GHz to again produce a 3 GHz IF signal. This approach works because we have chosen transmit and receive frequencies that are separated by the amount of the IF frequency. We are able to choose such and IF due to the amount of overall spectrum available in the 71–76 GHz band, and the data rate employed by the radio (1.25 GHz).

Other Embodiments

Any millimeter-wave carrier frequency range such as 71–76 GHz, 81–86 GHz, and 92–100 GHz, can be utilized in the practice of this invention. Likewise any of the several currently allocated microwave bands, such as 5.2–5.9 GHz, 5.9–6.9 GHz, 10.7–11.7 GHz, 17.7–19.7 GHz, and 21.2–23.6 GHz can be utilized for the backup link. The modulation bandwidth of both the MMW and microwave channels can be increased, limited again only by FCC spectrum allocations. Also, any flat, conformal, or shaped antenna capable of transmitting the modulated carrier over the link distance in a means consistent with FCC emissions regulations can be used. Horns, prime focus and offset parabolic dishes, and planar slot arrays are all included.

Transmit power may be generated with a Gunn diode source, an injection-locked amplifier or a MMW tube source resonating at the chosen carrier frequency or at any subharmonic of that frequency. Source power can be amplitude, frequency or phase modulated using a diode switch, a mixer or a biphase or continuous phase modulator. Modulation can take the form of simple bi-state AM modulation, or can involve more than two symbol states; e.g. using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase, or quadrature phase-shift keying (QPSK). Transmission with a full or suppressed carrier can be used. Digital source modulation can be performed at any date rate in bits per second up to 256 times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and millimeter-wave amplifier can be made on indium phosphide, gallium arsenide, or metamorphic InP-on-GaAs. The millimeter-wave amplifier can be eliminated completely for short-range links. The detector can be made using silicon or gallium arsenide. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

The backup transceivers can use alternate bands, which are covered under FCC Part 101 licensing regulations. In network use, a router or switch will typically partition a data stream to use both the millimeter wave link and the microwave link simultaneously. During severe weather, the millimeter wave link will cease to deliver data and the router or switch will automatically send all data through the microwave back up link until such time as the weather clears and the millimeter wave link automatically resumes operation. The antennas can be Cassegrainian, offset or prime focus dishes, or flat panel slot array antennas, of any size appropriate to achieve suitable gain.

The antenna used in the system may be of various sizes, from 1" to several feet in diameter. Flat panel antennas may be used in place of dish antennas. A prime focus antenna rather than a Cassegrain feed may be employed. The antenna need not be directional, or may form beams in several directions. Preferred frequency ranges are 71 GHz to 76 GHz, as described above, and the frequency range of 81 GHz to 86 GHz. Other frequency bands may be employed, including 92–95 GHz. Various methods of achieving the millimeter-wave transmit power or local oscillator may be used, including frequency doubling, integrated power amplifiers, Gunn oscillators, quasi-optical amplifiers, or other techniques. For on-off keying implementations of this invention, various methods of modulating the transmit power may be employed, including PIN diode modulators, voltage controlled amplifiers, quasi-optical modulators, or other techniques. Various methods of amplifying and detecting the received signal may be employed, including diode power detectors, synchronous detection, or other methods. Modulation techniques other than on-off keying may be used in the implementation of this invention. GPS receivers other than that specified here may be employed, or another technique for position determination (other than through the use of GPS) may be used.

While the above description contains many specifications, the reader should not construe these as a limitation on the scope of the invention, but merely as exemplifications of preferred embodiments thereof. For example, the fully allocated millimeter-wave band referred to in the description of the preferred embodiment described in detail above along with state of the art modulation schemes may permit transmittal of data at rates exceeding 10 Gbits per second. Such data rates would permit links compatible with 10-Gigabit Ethernet, a standard that is expected to become practical within the next two years. The present invention is especially useful in those locations where fiber optics communication is not available and the distances between communications sites are less than about 15 miles but longer than the distances that could be reasonably served with free space laser communication devices. Ranges of about 1 mile to about 10 miles are ideal for the application of the present invention. However, in regions with mostly clear weather the system could provide good service to distances of 20 miles or more. Accordingly the reader is requested to determine the scope of the invention by the appended claims and their legal equivalents, and not by the examples given above.

What is claimed is:
1. A millimeter wave communications system comprising:
A) a first millimeter wave transceiver system located at a first site capable of transmitting and receiving to and from a second site through atmosphere digital information at frequencies greater than 70 GHz and at data rates of about 1.25 Gbps or greater, said first transceiver comprising:
  1) at least one antenna producing a beam having a half-power beam width of about 2 degrees or less, and
  2) a high performance modulator circuit comprising:
    a) a diode defining a diode capacitance and a lead inductance and
    b) a tuning means,
wherein in an "off" state, the tuning means, diode capacitance and lead inductance all combine to form a resonant LC circuit which, when tuned, presents a radio frequency short across a transmission line in said first transceiver stopping transmission at a transmission frequency in excess of 70 GHz and
wherein in an "on" state, the tuning means, diode capacitance and lead inductance all combine to form a resonant LC circuit which, when out of tune, removes the radio frequency short across the transmission line permitting transmission at a transmission frequency in excess of 70 GHz; and
B) a second millimeter wave transceiver system located at said second site capable of transmitting and receiving to and from said first site digital information at frequencies greater than 70 GHz and at data rates of about 1.25 Gbps or greater, said second transceiver comprising:
  1) at least one antenna producing a beam having a half-power beam width of about 2 degrees or less and
  2) a high performance modulator circuit comprising:
    a) a diode defining a diode capacitance and a lead inductance and
    b) a tuning means,
wherein in an "off" state, the tuning means, diode capacitance and lead inductance all combine to form a resonant LC circuit which, when tuned, presents a radio frequencv short across a transmission line in said first transceiver stopping transmission at a transmission frequency in excess of 70 GHz and
wherein in an "on " state, the tuning means, diode capacitance and lead inductance all combine to form a resonant LC circuit which, when out of tune, removes the radio frequency short across the transmission line permitting transmission at a transmission frequency in excess of 70 GHz.

2. The system as in claim 1 further comprising a power control means for controlling transmit power at said first transceiver system based on information derived from received signal strength at said second transceiver system and for controlling transmit power at said second transceiver system based on information derived from received signal strength at said first transceiver system.

3. The system as in claim 1 wherein one of said first and second transceiver systems is configured to transmit at frequencies in the range of about 71.8+/−0.63 GHz and to receive information at frequencies in the range of about 73.8+/−0.63 GHz.

4. The system as in claim 1 wherein one of said first and second transceiver systems is configured to transmit at frequencies in the range of about 92.3 to 93.2 GHz and to receive information at frequencies in the range of about 94.1 to 95.0 GHz.

5. The system as in claim 1 further comprising a back-up transceiver system configured to provide continue transmittal of information between said first and second sites in the event of abnormal weather conditions.

6. The system as in claim 5 wherein said backup transceiver system is configured to operate in the frequency range of less than 11.7 GHz.

7. The system as in claim 5 wherein said backup transceiver system is a microwave system.

8. The system as in claim 1 wherein each of said first and said second transceiver is configured to transmit and receive information at bit error rates of less than $10^{-10}$ during normal weather conditions.

9. The system as in claim 1 wherein both said first and said second transceiver systems are equipped with antennas providing a gain of greater than 50 dB.

10. The system as m claim 1 wherein said first transceiver system is configured to transmit and receive information at frequencies between 71 and 76 GHz.

11. The system as in claim 1 wherein said first transceiver system is configured to transmit and receive information at frequencies between 81 and 86 GHz.

12. The system as in claim 1 wherein said first transceiver system is configured to transmit and receive information at frequencies between 71 and 86 GHz.

13. The system as in claim 1 wherein said first transceiver system is configured to transmit and receive information at frequencies between 92 and 95 GHz.

14. The system as in claim 1 wherein said first transceiver system is configured to transmit and receive information at frequencies between 71 and 95 GHz.

15. The system as in claim 1 wherein said tuning means in each of said first and second modulator circuits comprises a biasing means to change bias on the diode in the circuit.

16. The system as in claim 1 wherein each of said first and second transceivers comprise two antennas, a transmit antenna and a receive antenna.

17. The system as in claim 1 wherein each of said first and second transceivers comprise only one antenna configured to transmit and to receive.

18. The system as in claim 1 wherein at least one of said first transceiver system or said second transceiver system comprises a GPS unit.

19. The system as in claim 1 wherein said tuning means in each of said first and second modulator circuits comprises a tuning stub.

20. The system as in claim 1 wherein said first and said second sites are separated by at least one mile.

21. The system as in claim 1 wherein said first and said second sites are separated by at least 10 miles.

22. The system as in claim 1 wherein said first and said second sites are separated by at least 2 miles.

23. The system as in claim 1 wherein said first and said second sites are separated by at least 7 miles.

24. The system as in claim 1 wherein at least one of said antennas is a Cassegrain antenna.

25. The system as in claim 1 wherein at least one of said antennas is a flat panel antenna.

* * * * *